US009483506B2

(12) United States Patent
Meacham et al.

(10) Patent No.: US 9,483,506 B2
(45) Date of Patent: *Nov. 1, 2016

(54) HISTORY PRESERVING DATA PIPELINE

(71) Applicant: Palantir Technologies, Inc., Palo Alto, CA (US)

(72) Inventors: Jacob Meacham, Sunnyvale, CA (US); Michael Harris, Palo Alto, CA (US); Gustav Brodman, Palo Alto, CA (US); Lynn Cuthriell, San Francisco, CA (US); Hannah Korus, Palo Alto, CA (US); Brian Toth, Palo Alto, CA (US); Jonathan Hsiao, Palo Alto, CA (US); Mark Elliot, Arlington, VA (US); Brian Schimpf, Vienna, VA (US); Michael Garland, Palo Alto, CA (US); Evelyn Nguyen, Menlo Park, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,916

(22) Filed: Oct. 9, 2015

(65) Prior Publication Data
US 2016/0125000 A1    May 5, 2016

Related U.S. Application Data

(63) Continuation of application No. 14/533,433, filed on Nov. 5, 2014, now Pat. No. 9,229,952.

(51) Int. Cl.
*G06F 17/30* (2006.01)
*G06F 11/14* (2006.01)

(52) U.S. Cl.
CPC ..... *G06F 17/30309* (2013.01); *G06F 11/1451* (2013.01); *G06F 17/3023* (2013.01); *G06F 17/30227* (2013.01)

(58) Field of Classification Search
None
See application file for complete search history.

(56) References Cited

U.S. PATENT DOCUMENTS

| 6,289,338 | B1 | 9/2001 | Stoffel et al. |
| 6,463,404 | B1 | 10/2002 | Appleby |
| 6,523,172 | B1 | 2/2003 | Martinez-Guerra et al. |
| 6,539,538 | B1 | 3/2003 | Brewster et al. |
| 6,640,231 | B1 | 10/2003 | Andersen et al. |

(Continued)

FOREIGN PATENT DOCUMENTS

| CA | 2666364 | 1/2015 |
| DE | 102014204840 | 9/2014 |

(Continued)

OTHER PUBLICATIONS

U.S. Appl. No. 14/508,696, filed Oct. 7, 2014, Office Action, Mar. 2, 2015.

(Continued)

*Primary Examiner* — Son T Hoang
(74) *Attorney, Agent, or Firm* — Hickman Palermo Becker Bingham LLP; Adam C. Stone

(57) ABSTRACT

A history preserving data pipeline computer system and method. In one aspect, the history preserving data pipeline system provides immutable and versioned datasets. Because datasets are immutable and versioned, the system makes it possible to determine the data in a dataset at a point in time in the past, even if that data is no longer in the current version of the dataset.

12 Claims, 10 Drawing Sheets

(56) References Cited

U.S. PATENT DOCUMENTS

| | | |
|---|---|---|
| 6,748,481 B1 | 6/2004 | Parry et al. |
| 6,877,137 B1 | 4/2005 | Rivette et al. |
| 7,027,974 B1 | 4/2006 | Busch et al. |
| 7,089,541 B2 | 8/2006 | Ungar |
| 7,237,192 B1 | 6/2007 | Stephenson et al. |
| 7,240,330 B2 | 7/2007 | Fairweather |
| 7,533,069 B2 | 5/2009 | Fairweather |
| 7,685,083 B2 | 3/2010 | Fairweather |
| 7,877,421 B2 | 1/2011 | Berger et al. |
| 7,962,495 B2 | 6/2011 | Jain et al. |
| 8,117,022 B2 | 2/2012 | Linker |
| 8,132,149 B2 | 3/2012 | Shenfield et al. |
| 8,271,948 B2 | 9/2012 | Talozi et al. |
| 8,332,354 B1* | 12/2012 | Chatterjee ............ G06F 11/1461 707/624 |
| 8,418,085 B2 | 4/2013 | Snook et al. |
| 8,489,623 B2 | 7/2013 | Jain et al. |
| 8,560,494 B1 | 10/2013 | Downing et al. |
| 8,689,182 B2 | 4/2014 | Leithead et al. |
| 8,855,999 B1 | 10/2014 | Elliot |
| 8,903,717 B2 | 12/2014 | Elliot |
| 8,930,897 B2 | 1/2015 | Nassar |
| 9,009,827 B1 | 4/2015 | Albertson et al. |
| 9,201,920 B2 | 12/2015 | Jain et al. |
| 9,223,773 B2 | 12/2015 | Isaacson |
| 9,229,952 B1 | 1/2016 | Meacham et al. |
| 2003/0074187 A1 | 4/2003 | Ait-Mokhtar et al. |
| 2003/0172053 A1 | 9/2003 | Fairweather |
| 2003/0177112 A1 | 9/2003 | Gardner |
| 2004/0044992 A1 | 3/2004 | Muller et al. |
| 2004/0083466 A1 | 4/2004 | Dapp et al. |
| 2004/0221223 A1 | 11/2004 | Yu et al. |
| 2004/0260702 A1 | 12/2004 | Cragun et al. |
| 2005/0039119 A1 | 2/2005 | Parks et al. |
| 2005/0091420 A1 | 4/2005 | Snover et al. |
| 2005/0183005 A1 | 8/2005 | Denoue et al. |
| 2006/0271838 A1 | 11/2006 | Carro |
| 2007/0074169 A1 | 3/2007 | Chess et al. |
| 2007/0078872 A1 | 4/2007 | Cohen |
| 2007/0112714 A1 | 5/2007 | Fairweather |
| 2007/0233709 A1 | 10/2007 | Abnous |
| 2008/0034327 A1* | 2/2008 | Cisler ................... G06F 9/4443 715/854 |
| 2008/0140387 A1 | 6/2008 | Linker |
| 2008/0148398 A1 | 6/2008 | Mezack et al. |
| 2008/0228467 A1 | 9/2008 | Womack et al. |
| 2008/0281580 A1 | 11/2008 | Zabokritski |
| 2009/0172821 A1 | 7/2009 | Daira et al. |
| 2009/0177962 A1 | 7/2009 | Gusmorino et al. |
| 2009/0228507 A1 | 9/2009 | Jain et al. |
| 2009/0254970 A1 | 10/2009 | Agarwal et al. |
| 2010/0011282 A1 | 1/2010 | Dollard et al. |
| 2010/0204983 A1 | 8/2010 | Chung et al. |
| 2010/0257015 A1* | 10/2010 | Molander .......... G06Q 10/1097 705/7.21 |
| 2010/0257515 A1* | 10/2010 | Bates ..................... G06F 8/71 717/145 |
| 2010/0306285 A1 | 12/2010 | Shah et al. |
| 2010/0313119 A1 | 12/2010 | Baldwin et al. |
| 2011/0213791 A1 | 9/2011 | Jain et al. |
| 2011/0258216 A1 | 10/2011 | Supakkul et al. |
| 2012/0137235 A1 | 5/2012 | TS et al. |
| 2012/0191446 A1 | 7/2012 | Binsztok et al. |
| 2012/0221553 A1 | 8/2012 | Wittmer et al. |
| 2012/0304150 A1 | 11/2012 | Leithead et al. |
| 2013/0024268 A1 | 1/2013 | Manickavelu |
| 2013/0086482 A1 | 4/2013 | Parsons |
| 2013/0091084 A1 | 4/2013 | Lee |
| 2013/0124193 A1 | 5/2013 | Holmberg |
| 2013/0225212 A1 | 8/2013 | Khan |
| 2013/0246560 A1 | 9/2013 | Feng et al. |
| 2013/0251233 A1 | 9/2013 | Yang et al. |
| 2013/0275446 A1 | 10/2013 | Jain et al. |
| 2014/0019423 A1 | 1/2014 | Liensberger et al. |
| 2014/0047319 A1 | 2/2014 | Eberlein |
| 2014/0244388 A1 | 8/2014 | Manouchehri et al. |
| 2015/0046481 A1 | 2/2015 | Elliot |
| 2015/0100559 A1 | 4/2015 | Nassar |
| 2015/0142766 A1 | 5/2015 | Jain et al. |
| 2015/0261847 A1 | 9/2015 | Ducott et al. |

FOREIGN PATENT DOCUMENTS

| | | |
|---|---|---|
| DE | 102014215621 | 2/2015 |
| EP | 2221725 | 8/2010 |
| EP | 2778913 | 9/2014 |
| EP | 2778914 | 9/2014 |
| EP | 2778986 | 9/2014 |
| EP | 2911078 | 8/2015 |
| EP | 3 018 553 A1 | 5/2016 |
| GB | 2366498 | 3/2002 |
| GB | 2513007 | 10/2014 |
| GB | 2518745 | 4/2015 |
| NL | 2013306 | 2/2015 |
| NL | 2011642 | 8/2015 |
| WO | WO 02/35376 | 5/2002 |
| WO | WO 03/060751 | 7/2003 |
| WO | WO 2008/064207 | 5/2008 |
| WO | WO 2011/071833 | 6/2011 |

OTHER PUBLICATIONS

U.S. Appl. No. 14/044,800, filed Oct. 2, 2013, Notice of Allowance, Sep. 2, 2014.

U.S. Appl. No. 14/148,568, filed Jan. 6, 2014, Office Action, Mar. 26, 2015.

U.S. Appl. No. 14/148,568, filed Jan. 6, 2014, Final Office Action, Oct. 22, 2014.

U.S. Appl. No. 14/553,433, filed Nov. 5, 2014, Office Action, Feb. 26, 2015.

U.S. Appl. No. 14/025,653, filed Sep. 12, 2013, First Interview Pilot Program, Oct. 6, 2015.

U.S. Appl. No. 14/508,696, filed Oct. 7, 2014, Notice of Allowance, Jul. 27, 2015.

U.S. Appl. No. 17/148,568, filed Jan. 6, 2014, Notice of Allowance, Aug. 26, 2015.

U.S. Appl. No. 14/553,433, filed Nov. 5, 2014, Notice of Allowance, Sep. 1, 2015.

"A Tour of Pinboard," <http://pinboard.in/tour> as printed May 15, 2014 in 6 pages.

"BackTult—JD Edwards One World Version Control System," printed Jul. 23, 2007 in 1 page.

Delicious, <http://delicious.com/> as printed May 15, 2014 in 1 page.

Geiger, Jonathan G., "Data Quality Management, The Most Critical Initiative You Can Implement," Data Warehousing, Management and Quality, Paper 098-29, SUGI 29, Intelligent Solutions, Inc., Bounder, Co, pp. 14, accessed Oct. 3, 2013.

Johnson, Maggie "Introduction to YACC and Bison".

Kahan et al., "Annotea: an Open RDF Infastructure for Shared Web Annotations", Computer Networks, Elsevier Science Publishers B.V., vol. 39, No. 5, dated Aug. 5, 2002, pp. 589-608.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontoloty Management System (Design)," Information Societies Technology Programme, Jan. 10, 2002, pp. 1-27.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.

Niepert et al., "A Dynamic Ontology for a Dynamic Reference Work", Joint Conference on Digital Libraries, Jun. 17-22, 2007, Vancouver, British Columbia, Canada, pp. 1-10.

(56) References Cited

OTHER PUBLICATIONS

Nivas, Tuli, "Test Harness and Script Design Principles for Automated Testing of non-GUI or Web Based Applications," Performance Lab, Jun. 2011, pp. 30-37.
Palantir, "Extracting and Transforming Data with Kite," Palantir Technologies, Inc., Copyright 2010, pp. 38.
Palantir, "Kite," https://docs.palantir.com/gotham/3.11.1.0/adminreference/datasources.11 printed Aug. 30, 2013 in 2 pages.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Wollrath et al., "A Distributed Object Model for the Java System," Conference on Object-Oriented Technologies and Systems, Jun. 17-21, 1996, pp. 219-231.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622414 dated Mar. 24, 2014.
Official Communication for New Zealand Patent Application No. 622497 dated Mar. 26, 2014.
Official Communication for New Zealand Patent Application No. 622484 dated Apr. 2, 2014.
Official Communication for New Zealand Patent Application No. 622513 dated Apr. 3, 2014.
Official Communication for European Patent Application No. 14158958.0 dated Jun. 3, 2014.
Official Communication for Canadian Patent Application No. 2666364 dated Jun. 4, 2012.
Official Communication for European Patent Application No. 14158977.0 dated Jun. 10, 2014.
Official Communication for New Zealand Patent Application No. 622497 dated Jun. 19, 2014.
Official Communication for European Patent Application No. 14159629.6 dated Jul. 31, 2014.
Official Communication for Great Britain Patent Application No. 1404479.6 dated Aug. 12, 2014.
Official Communication for Israel Patent Application No. 198253 dated Nov. 24, 2014.
Official Communication for Great Britain Patent Application No. 1413935.6 dated Jan. 27, 2015.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014201580 dated Feb. 27, 2015.
Official Communication for European Patent Application No. 14158977.0 dated Apr. 16, 2015.
Official Communication for European Patent Application No. 14158958.0 dated Apr. 16, 2015.
Official Communication for Netherlands Patent Application No. 2013306 dated Apr. 24, 2015.
Official Communication for Great Britain Patent Application No. 1404479.6 dated Jul. 9, 2015.
European Patent Office, Search Report in application No. 15192965.0-1957, dated Mar. 17, 2016, 7 pages.
European Claims in application No. 15192965.0-1957, dated Mar. 2016, 3 pages.
Symantec Corporation, "E-Security Begins with Sound Security Policies," Announcement Symantec, Jun. 14, 2001.
Official Communication for European Patent Application No. 15155845.9 dated Oct. 6, 2015.
Palantir, https://docs.palantir.com/gotham/3.11.1.0/dataguide/baggage/KiteSchema printed Aug. 30, 2013 in 1 page.
Official Communication for Australian Patent Application No. 2014201511 dated Feb. 27, 2015.
Official Communication for Great Britain Patent Application No. 1413935.6 dated Dec. 21, 2015.
Official Communication for Israel Patent Application No. 198253 dated Jan. 12, 2016.
Official Communication for Netherlands Patent Application No. 2012434 dated Jan. 8, 2016.
Official Communication for European Patent Application No. 14158977.0 dated Mar. 11, 2016.
Official Communication for European Patent Application No. 14158958.0 dated Mar. 11, 2016.
Official Communication for European Patent Application No. 14159464.8 dated Feb. 18, 2016.
U.S. Appl. No. 14/631,633, filed Feb. 25, 2015, First Office Action Interview, Feb. 3, 2016.
U.S. Appl. No. 14/526,066, filed Oct. 28, 2014, Office Action, Jan. 21, 2016.
U.S. Appl. No. 14/025,653, filed Sep. 12, 2013, Interview Summary, Mar. 3, 2016.
U.S. Appl. No. 14/134,558, filed Dec. 19, 2013, Office Action, Oct. 7, 2015.
U.S. Appl. No. 14/526,066, filed Oct. 28, 2014, Final Office Action, Mar. 6, 2016.
U.S. Appl. No. 13/557,100, filed Jul. 24, 2012, Final Office Action, Apr. 7, 2016.
U.S. Appl. No. 14/134,558, filed Dec. 19, 2013, Final Office Action, May 16, 2016.
U.S. Appl. No. 14/954,680, filed Nov. 30, 2015, Office Action, May 12, 2016.

\* cited by examiner

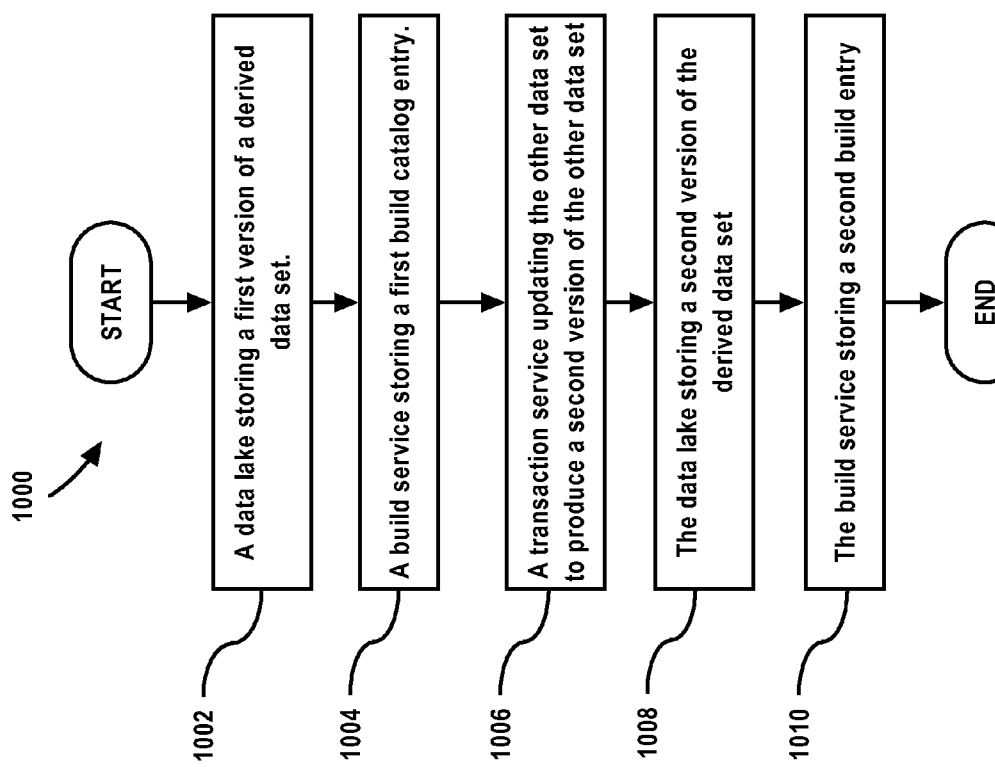

HISTORY PRESERVING DATA PIPELINE

PRIORITY CLAIM

This application is a Continuation of U.S. patent application Ser. No. 14/533,433, filed Nov. 5, 2014, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The disclosed technologies relate generally to data pipeline computer systems and, more particularly, to a data pipeline computer system with methodology for preserving history of datasets.

BACKGROUND

Computers are very powerful tools for processing data. A computerized data pipeline is a useful mechanism for processing large amounts of data. A typical data pipeline is an ad-hoc collection of computer software scripts and programs for processing data extracted from "data sources" and for providing the processed data to "data sinks" As an example, a data pipeline for a large insurance company that has recently acquired a number of smaller insurance companies may extract policy and claim data from the individual database systems of the smaller insurance companies, transform and validate the insurance data in some way, and provide validated and transformed data to various analytical platforms for assessing risk management, compliance with regulations, fraud, etc.

Between the data sources and the data sinks, a data pipeline system is typically provided as a software platform to automate the movement and transformation of data from the data sources to the data sinks. In essence, the data pipeline system shields the data sinks from having to interface with the data sources or even being configured to process data in the particular formats provided by the data sources. Typically, data from the data sources received by the data sinks is processed by the data pipeline system in some way. For example, a data sink may receive data from the data pipeline system that is a combination (e.g., a join) of data of from multiple data sources, all without the data sink being configured to process the individual constituent data formats.

One purpose of a data pipeline system is to execute data transformation steps on data obtained from data sources to provide the data in format expected by the data sinks A data transformation step may be defined as a set of computer commands or instructions which, when executed by the data pipeline system, transforms one or more input datasets to produce one or more output or "target" datasets. Data that passes through the data pipeline system may undergo multiple data transformation steps. Such a step can have dependencies on the step or steps that precede it. One example of a computer system for carrying out data transformation steps in a data pipeline is the well-known MapReduce system. See, e.g., Dean, Jeffrey, et al., "MapReduce: Simplified Data Processing on Large Clusters", Google, Inc., 2004.

Often, data pipeline systems are maintained "by hand". That is, a software engineer or system administrator is responsible for configuring the system so that data transformation steps are executed in the proper order and on the correct datasets. If a data transformation step needs to be added, removed, or changed, the engineer or administrator typically must reconfigure the system by manually editing control scripts or other software programs. Similar editing tasks may be needed before the pipeline can process new datasets. Overall, current approaches for maintaining existing data pipeline systems may require significant human resources.

Another problem with existing data pipeline systems is the lack of dataset versioning. In these systems, when a dataset needs to be updated with new data, the data transformation step typically overwrites the old version of the dataset with the new version. This can be problematic if it is suspected or discovered thereafter that the old version of the dataset contained incorrect data that the new version does not contain. For example, the old version of the dataset may have been imported into an analytical software program which generated anomalous results based on the incorrect data. In this case, since the old version is lost when the new version is generated, it can be difficult to track down the source of the incorrect data.

Given the increasing amount of data collected by businesses and other organizations, processing data of all sorts through data pipeline systems can only be expected to increase. This trend is coupled with a need for a more automated way to maintain such systems and for the ability to trace and track data, including old versions of the data, as it moves through the data pipeline from data sources to data sinks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A history preserving data pipeline computer system and associated method are described. In a first embodiment, for example, a method for preserving history of a derived dataset, comprises the steps of: storing a first version of a derived dataset; wherein the first version of the derived dataset is derived from at least a first version of another dataset by executing a first version of derivation program associated with the derived dataset; storing a first build catalog entry, the first build catalog entry associated with the derived dataset and comprising an identifier of the first version of the other dataset and comprising an identifier of the first version of the derivation program; updating the other dataset to produce a second version of the other dataset; storing a second version of the derived dataset; wherein the second version of the derived dataset is derived from at least the second version of the other dataset by executing the first version of the derivation program associated with the derived dataset; and storing a second build entry, the second build entry associated with the derived dataset and comprising an identifier of the second version of the other dataset and comprising an identifier of the first version of the derivation program.

In one aspect of the first embodiment embodiment, the method further comprises the step of storing the first version of the derived dataset and the second version of the derived dataset in a data lake. In one embodiment, the data lake comprises a distributed file system.

In one aspect of the first embodiment, the first build catalog entry comprises a name of the derived dataset and an identifier of the first version of the derived dataset. In one embodiment, the identifier of the first version of the derived dataset is an identifier assigned to a commit of a transaction that stored the first version of the derived dataset.

In one aspect of the first embodiment, the second build catalog entry comprises a name of the derived dataset and an identifier of the second version of the derived dataset. In one embodiment, the identifier of the second version of the derived dataset is an identifier assigned to a commit of a transaction that stored the second version of the derived dataset.

In one aspect of the first embodiment, the first version of the derived dataset is stored in a first set of one or more data containers and the second version of the derived dataset is stored in a second set of one or more data containers. In one embodiment, the second set of one or more data containers comprises delta encodings reflecting deltas between the first version of the derived dataset and the second version of the derived dataset.

In one aspect of the first embodiment, the first version of the derivation program, when executed to produce the first version of the derived dataset, transforms data of the first version of the other dataset to produce data of the first version of the derived dataset.

In one aspect of the first embodiment, the first version of the derivation program, when executed to produce the second version of the derived dataset, transforms data of the second version of the other dataset to produce data of the second version of the derived dataset.

In one aspect of the first embodiment, the method steps of storing the first version of the derived dataset and storing the second version of the derived dataset are performed by a data lake.

In one aspect of the first embodiment, the steps of storing the first build catalog entry and storing the second build catalog entry are performed by a build service.

In one aspect of the first embodiment, the step updating the other dataset to produce the second version of the other dataset is performed by a transaction service.

In one aspect of the first embodiment, the first build catalog entry and the second build catalog entry are stored in a database.

In one aspect of the first embodiment, the method further comprises the step of storing a transaction entry in a database comprising a transaction commit identifier of the first version of the derived dataset. In one embodiment, the first build catalog entry comprises the transaction commit identifier.

In one aspect of the first embodiment, the method further comprises the step of storing a transaction entry in a database comprising a transaction commit identifier of the second version of the derived dataset. In one embodiment, the second build catalog entry comprises the transaction commit identifier.

In one aspect of the first embodiment, the method further comprises the step of storing a transaction entry in a database comprising a transaction commit identifier of the first version of the other dataset. In one embodiment, the identifier of the first version of the other dataset in the first build catalog entry is the transaction commit identifier.

In one aspect of the first embodiment, the method further comprises storing a transaction entry in a database comprising a transaction commit identifier of the second version of the other dataset. In an embodiment, the identifier of the second version of the other dataset in the second build catalog entry is the transaction commit identifier.

In other aspects of the first embodiment, the invention encompasses a computer system and a computer-readable medium configured to carry out the foregoing operations of the various aspects of the first embodiment.

In a second embodiment, for example, a method for preserving history of a derived dataset is performed at one or more computing devices comprising one or more processors and storage media storing one or more computer programs executed by the one or more processors to perform the method. Performance of the method includes performing operations comprising: storing a first version of a derived dataset; storing a first build catalog entry; updating another dataset to produce a second version of the other dataset; storing a second version of the derived dataset; and storing a second build catalog entry. The first build catalog entry is associated with the derived dataset and comprises an identifier of the first version of the other dataset and an identifier of the first version of the derivation program. The first version of the derived dataset is derived from at least a first version of the other dataset by executing a first version of derivation program associated with the derived dataset. The first build catalog entry comprises a name of the derived dataset and an identifier of the first version of the derived dataset. The second version of the derived dataset is derived from at least the second version of the other dataset by executing the first version of the derivation program associated with the derived dataset. The second build catalog entry is associated with the derived dataset and comprises an identifier of the second version of the other dataset and an identifier of the first version of the derivation program. The second build catalog entry comprises a name of the derived dataset and an identifier of the second version of the derived dataset.

In one aspect of the second embodiment, the operations further comprising the operation of storing the first version of the derived dataset and the second version of the derived dataset in a data lake.

In one aspect of the second embodiment, wherein the data lake comprises a distributed file system.

In one aspect of the second embodiment, the identifier of the first version of the derived dataset is an identifier assigned to a commit of a transaction that stored the first version of the derived dataset.

In one aspect of the second embodiment, the identifier of the second version of the derived dataset is an identifier assigned to a commit of a transaction that stored the second version of the derived dataset.

In one aspect of the second embodiment, the first version of the derived dataset is stored in a first set of one or more data containers and the second version of the derived dataset is stored in a second set of one or more data containers.

In one aspect of the second embodiment, the second set of one or more data containers comprises delta encodings reflecting deltas between the first version of the derived dataset and the second version of the derived dataset.

In one aspect of the second embodiment, the first version of the derivation program, when executed to produce the first version of the derived dataset, transforms data of the first version of the other dataset to produce data of the first version of the derived dataset.

In one aspect of the second embodiment, the first version of the derivation program, when executed to produce the second version of the derived dataset, transforms data of the second version of the other dataset to produce data of the second version of the derived dataset.

In one aspect of the second embodiment, the operations of storing the first version of the derived dataset and storing the second version of the derived dataset are performed by a data lake.

In one aspect of the second embodiment, the operations of storing the first build catalog entry and storing the second build catalog entry are performed by a build service.

In one aspect of the second embodiment, the operation of updating the other dataset to produce the second version of the other dataset is performed by a transaction service.

In one aspect of the second embodiment, the first build catalog entry and the second build catalog entry are stored in a database.

In one aspect of the second embodiment, the operations further comprise the operation of storing a transaction entry in a database comprising a transaction commit identifier of the first version of the derived dataset. And the first build catalog entry comprises the transaction commit identifier.

In one aspect of the second embodiment, the operations further comprise the operation of storing a transaction entry in a database comprising a transaction commit identifier of the second version of the derived dataset. And the second build catalog entry comprises the transaction commit identifier.

In one aspect of the second embodiment, the operations further comprise the operation of storing a transaction entry in a database comprising a transaction commit identifier of the first version of the other dataset. And the identifier of the first version of the other dataset in the first build catalog entry is the transaction commit identifier.

In one aspect of the second embodiment, the operations further comprise the operation of storing a transaction entry in a database comprising a transaction commit identifier of the second version of the other dataset. And the identifier of the second version of the other dataset in the second build catalog entry is the transaction commit identifier.

In other aspects of the second embodiment, the invention encompasses a computer system and a computer-readable medium configured to carry out the foregoing operations of the various aspects of the second embodiment.

In a third embodiment, for example, a method is performed at one or more computing devices comprising one or more processors and one or more storage media storing one or more computer programs executed by the one or more processors to perform the method. The method includes performing operations comprising: maintaining a build catalog comprising a plurality of build catalog entries where each build catalog entry, of the plurality of build catalog entries, comprises: an identifier of a version of a derived dataset corresponding to the build catalog entry, one or more dataset build dependencies of the version of the derived dataset corresponding to the build catalog entry, each of the one or more dataset build dependencies comprising an identifier of a version of a child dataset from which the version of the derived dataset corresponding to the build catalog entry is derived, and a derivation program build dependency of the version of the derived dataset corresponding to the build catalog entry, the derivation program build dependency comprising an identifier of a version of a derivation program executed to generate the version of the derived dataset corresponding to the build catalog entry. The method further includes performing operations comprising creating a new version of a particular derived dataset in context of a successful transaction; and adding a new build catalog entry to the build catalog, the new build catalog entry comprising an identifier of the new version of the particular derived dataset, the identifier of the new version of the particular derived dataset being a transaction commit identifier assigned to the successful transaction.

In one aspect of the third embodiment, the operation of creating the new version of the particular derived dataset comprises the operation of executing a particular version of a particular derivation program; and wherein the new build catalog entry comprises an identifier of the particular version of the particular derivation program.

In one aspect of the third embodiment, a particular build catalog entry, of the plurality of build catalog entries, comprises a plurality of dataset build dependencies of the version of the derived dataset corresponding to the particular build catalog entry, each of the plurality of dataset build dependencies comprising an identifier of a version of a child dataset from which the version of the derived dataset corresponding to the particular build catalog entry is derived.

In one aspect of the third embodiment, the build catalog comprises a particular build catalog entry comprising an identifier of a version of a derived dataset corresponding to the build catalog entry but does not include any of a dataset build dependency or a derivation program build dependency.

In other aspects of the third embodiment, the invention encompasses a computer system and a computer-readable medium configured to carry out the foregoing operations of the various aspects of the third embodiment

BRIEF DESCRIPTION OF THE DRAWINGS

FIG. 10 is a flowchart illustrating steps of a computer-implemented process for preserving history of a derived dataset, according to an embodiment of the present invention.

DETAILED DESCRIPTION

Figure 1:
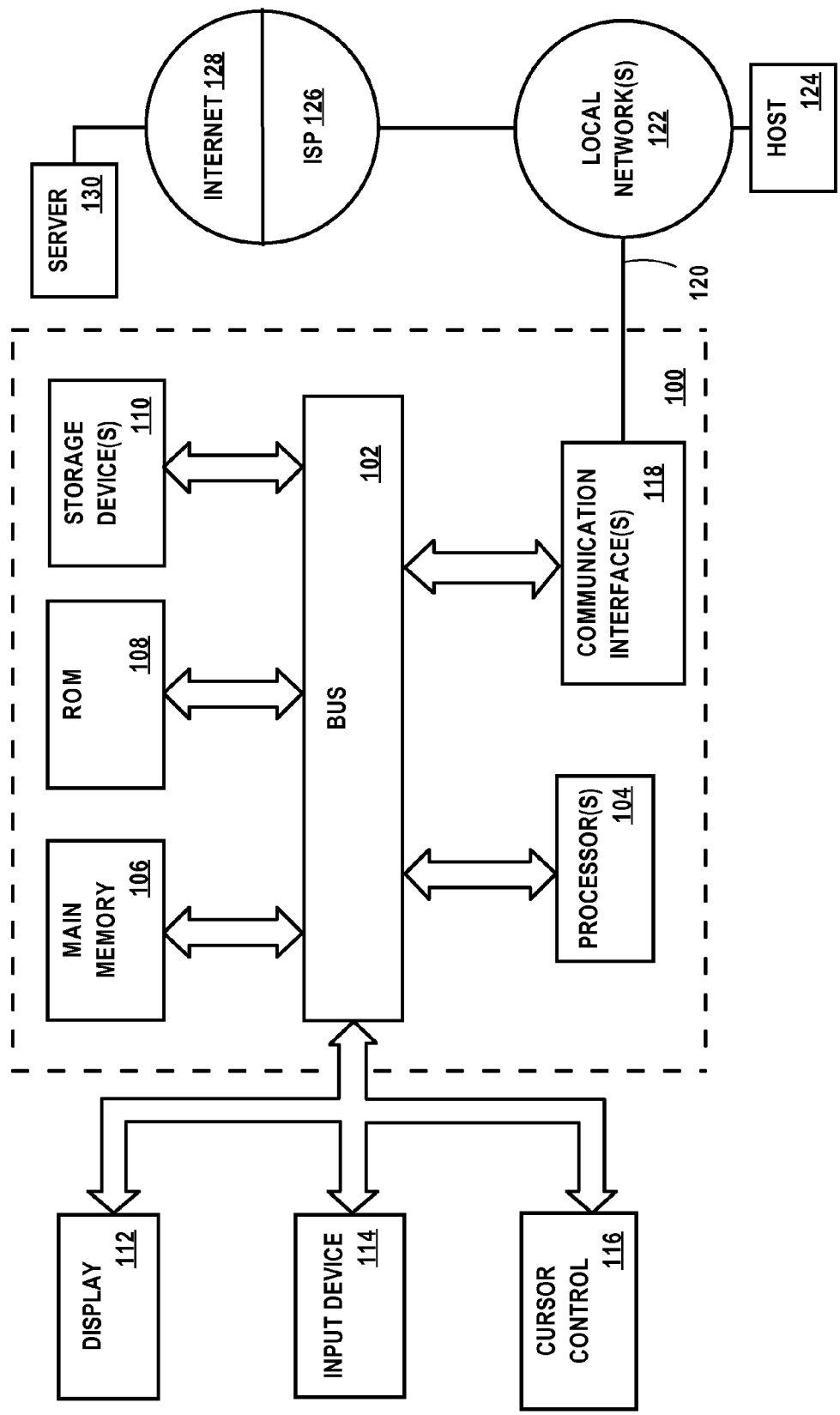
FIG. 1 is a very general block diagram of an example computing device which may be used for implementing the disclosed technologies.

In the following description, for the purposes of explanation, numerous specific details are set forth in order to provide a thorough understanding of the disclosed technologies. It will be apparent, however, that the disclosed technologies can be practiced without these specific details. In other instances, well-known structures and devices are shown in block diagram form in order to avoid unnecessarily obscuring the disclosed technologies. As to the flowcharts, each block within the flowcharts represents both a method step and an apparatus element for performing the method step. Depending upon the requirements of the particular implementation at hand, the corresponding apparatus element may be configured in hardware, software, firmware or combinations thereof.

1.0 Overview

Given the deficiencies of current manual and ad-hoc approaches for implementing and managing a data pipeline system, a more automated and integrated approach would clearly be preferable. In accordance with an embodiment of the disclosed technologies, a history preserving data pipeline system is provided.

In one aspect, the history preserving data pipeline system improves on existing data pipeline technologies to provide "immutable" and "versioned" datasets. A dataset may be defined as a named collection of data. The datasets are "immutable" in the sense that it is not necessary to overwrite existing dataset data in order modify the dataset. The datasets are "versioned" in the sense that modifications to a dataset, including historical modifications, are separately identifiable.

Because datasets are immutable and versioned, the system makes it possible to determine the data in a dataset at a point in time in the past, even if that data is no longer in the current version of the dataset. More generally, the history preserving data pipeline system improves on existing data pipeline systems by providing the ability to trace dataset data to the data source data from which the dataset data was derived or obtained, even if the dataset data is no longer in the current version of the dataset and even if the data source data is no longer available from the data source.

In another aspect, the history preserving data pipeline system improves on existing data pipeline technologies to provide immutable and versioned "derived" datasets. A derived dataset may be defined as a dataset that is generated (built) by executing a "derivation program", potentially providing one or more other datasets as input to the derivation program. When executed, the derivation program may perform one or more operations on the input dataset(s). For example, the derivation program may transform the data in the input dataset(s) in some way to produce the derived dataset. For example, a derivation program may produce a derived dataset by filtering records in an input dataset to those comprising a particular value or set of values, or by joining together two related input datasets, or by replacing references in an input dataset to values in another input dataset with actual data referenced. Because derived datasets, like datasets generally, are immutable and versioned in the system, it is possible to trace dataset data to the data source data from which the dataset data was derived or obtained, even if the dataset data is no longer in the current version of the derived dataset and even if the data source data is no longer available from the data source.

In yet another aspect, the history preserving data pipeline system improves on existing data pipeline systems by versioning derivation programs. By doing so, not only does the system provide the ability to trace dataset data to the data source data the dataset data is based on, but also, if the dataset is a derived dataset, to the version of the derivation program used to build the derived dataset. This is useful for tracking down errors in dataset data caused by errors or "bugs" (i.e., programming errors) in the version of the derivation program that was executed to build the dataset.

In yet another aspect, the history preserving data pipeline system improves on existing data pipeline systems by maintaining "build dependency data". The build dependency data represents one or more directed acyclic graphs of build dependencies. From the build dependency data, the system can determine, for a given dataset, the order in which to build other datasets before the given dataset can be built. By doing so, human engineers are alleviated from some manual tasks required by existing data pipeline systems related to maintaining and determining dataset build dependencies.

These and other aspects of the history preserving data pipeline system are described in greater detail elsewhere in this document. First, however, an example of the basic underlying computer components that may be employed for implementing the disclosed technologies are described.

2.0 Basic Computing Environment

The disclosed technologies may be implemented on one or more computing devices. Such a computing device may be implemented in various forms including, but not limited to, a client, a server, a network device, a mobile device, a cell phone, a smart phone, a laptop computer, a desktop computer, a workstation computer, a personal digital assistant, a blade server, a mainframe computer, and other types of computers. The computing device described below and its components, including their connections, relationships, and functions, is meant to be exemplary only, and not meant to limit implementations of the disclosed technologies described in this specification. Other computing devices suitable for implementing the disclosed technologies may have different components, including components with different connections, relationships, and functions.

2.1 Basic Computing Device

FIG. 1 is a block diagram that illustrates an example of a computing device 100 suitable for implementing the disclosed technologies. Computing device 100 includes bus 102 or other communication mechanism for addressing main memory 106 and for transferring data between and among the various components of device 100. Computing device 100 also includes one or more hardware processors 104 coupled with bus 102 for processing information. A hardware processor 104 may be a general purpose microprocessor, a system on a chip (SoC), or other processor suitable for implementing the described technologies.

Main memory 106, such as a random access memory (RAM) or other dynamic storage device, is coupled to bus 102 for storing information and instructions to be executed by processor(s) 104. Main memory 106 also may be used for storing temporary variables or other intermediate information during execution of instructions to be executed by processor(s) 104. Such instructions, when stored in non-transitory storage media accessible to processor(s) 104, render computing device 100 into a special-purpose computing device that is customized to perform the operations specified in the instructions.

Computing device 100 further includes read only memory (ROM) 108 or other static storage device coupled to bus 102 for storing static information and instructions for processor(s) 104.

One or more mass storage devices 110 are coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. Display 112 may also be a touch-sensitive display for communicating touch gesture (e.g., finger or stylus) input to processor(s) 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computing device 100 may implement the methods described herein using customized hard-wired logic, one or more application-specific integrated circuits (ASICs), one or more field-programmable gate arrays (FPGAs), firmware, or program logic which, in combination with the computing device, causes or programs computing device 100 to be a special-purpose machine.

Methods disclosed herein may also be performed by computing device 100 in response to processor(s) 104 executing one or more sequences of one or more instructions contained in main memory 106. Such instructions may be read into main memory 106 from another storage medium, such as storage device(s) 110. Execution of the sequences of instructions contained in main memory 106 causes processor(s) 104 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor(s) 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor(s) 104 retrieves and executes the instructions. The instructions received by main memory 106 may optionally be stored on storage device(s) 110 either before or after execution by processor(s) 104.

Computing device 100 also includes one or more communication interface(s) 118 coupled to bus 102. A communication interface 118 provides a two-way data communication coupling to a wired or wireless network link 120 that is connected to a local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link(s) 120 typically provide data communication through one or more networks to other data devices. For example, a network link 120 may provide a connection through a local network 122 to a host computer 124 or to data equipment operated by an Internet Service Provider (ISP) 126. ISP 126 in turn provides data communication services through the world wide packet data communication network now commonly referred to as the "Internet" 128. Local network(s) 122 and Internet 128 use electrical, electromagnetic or optical signals that carry digital data streams. The signals through the various networks and the signals on network link(s) 120 and through communication interface(s) 118, which carry the digital data to and from computing device 100, are example forms of transmission media.

Computing device 100 can send messages and receive data, including program code, through the network(s), network link(s) 120 and communication interface(s) 118. In the Internet example, a server 130 might transmit a requested code for an application program through Internet 128, ISP 126, local network(s) 122 and communication interface(s) 118.

The received code may be executed by processor 104 as it is received, and/or stored in storage device 110, or other non-volatile storage for later execution.

2.2 Basic Software System

Figure 2:
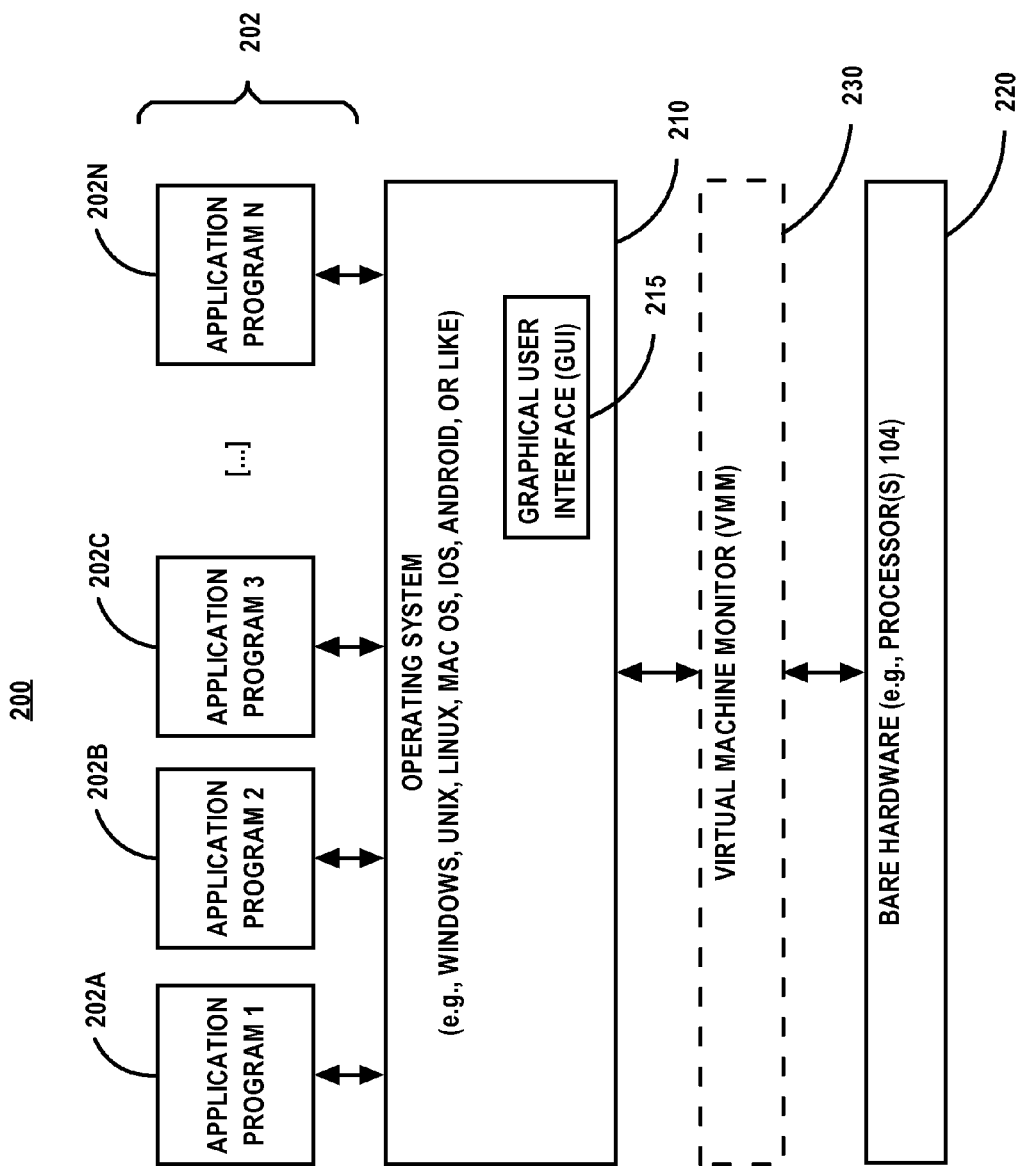
FIG. 2 is a block diagram of an example software system for controlling the operation of the computing device of FIG. 1.

FIG. 2 is a block diagram of a software system for controlling the operation of computing device 100. As shown, a computer software system 200 is provided for directing the operation of the computing device 100. Software system 200, which is stored in system memory (RAM) 106 and on fixed storage (e.g., hard disk) 110, includes a kernel or operating system (OS) 210. The OS 210 manages low-level aspects of computer operation, including managing execution of processes, memory allocation, file input and output (I/O), and device I/O. One or more application programs, such as client application software or "programs" 202 (e.g., 202A, 202B, 202C . . . 202N) may be "loaded" (i.e., transferred from fixed storage 110 into memory 106) for execution by the system 200. The applications or other software intended for use on the device 100 may also be stored as a set of downloadable computer-executable instructions, for example, for downloading and installation from an Internet location (e.g., Web server).

Software system 200 may include a graphical user interface (GUI) 215, for receiving user commands and data in a graphical (e.g., "point-and-click" or "touch gesture") fashion. These inputs, in turn, may be acted upon by the system 200 in accordance with instructions from operating system 210 and/or client application module(s) 202. The GUI 215 also serves to display the results of operation from the OS 210 and application(s) 202, whereupon the user may supply additional inputs or terminate the session (e.g., log off).

The OS 210 can execute directly on the bare hardware (e.g., processor(s) 104) 220 of device 100. Alternatively, a hypervisor or virtual machine monitor (VMM) 230 may be interposed between the bare hardware 220 and the OS 210. In this configuration, VMM 230 acts as a software "cushion" or virtualization layer between the OS 210 and the bare hardware 220 of the device 100.

VMM 230 instantiates and runs virtual machine instances ("guest machines"). Each guest machine comprises a "guest" operating system, such as OS 210, and one or more applications, such as applications 202, designed to execute on the guest operating system. The VMM 230 presents the guest operating systems with a virtual operating platform and manages the execution of the guest operating systems. In some instances, the VMM 230 may allow a guest operating system to run as through it is running on the bare hardware 220 of the device 100 directly. In these instances, the same version of the guest operating system configured to execute on the bare hardware 104 directly may also be able to execute on VMM 230 without modification or reconfiguration. In other words, VMM 230 may provide full hardware and CPU virtualization to a guest operating system in some instances. In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software are presented for purpose of illustrating basic underlying computer components that may be employed for implementing the disclosed technologies. The disclosed technologies, however, are not limited to any particular computing environment or computing device configuration. Instead, the disclosed technologies may be implemented in any type of system architecture or processing environment capable of supporting the disclosed technologies presented in detail below.

3.0 Distributed Computing Environment

Figure 3:
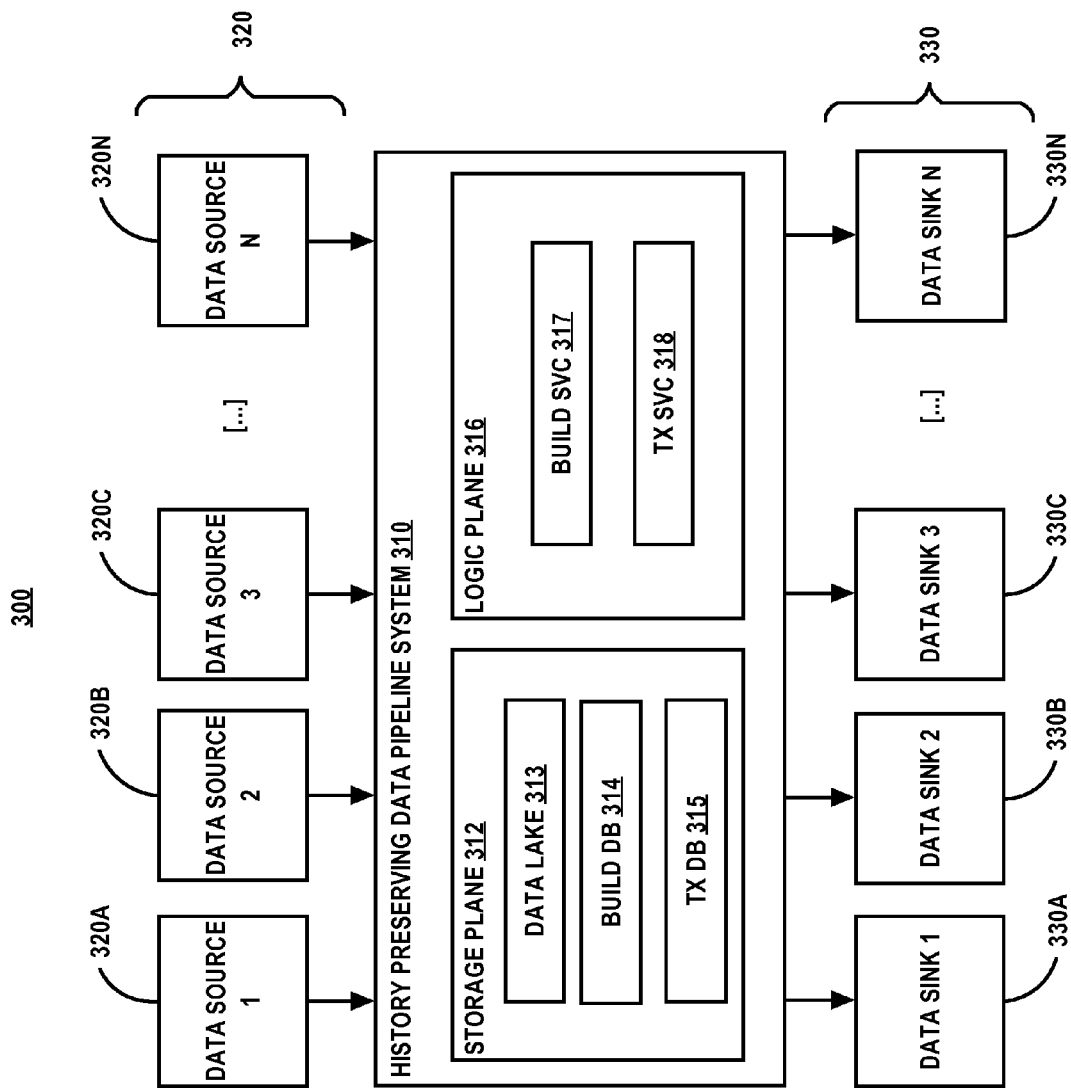
FIG. 3 is a block diagram of an example distributed computing environment in which the disclosed technologies may be implemented.

While the disclosed technologies may operate within a single standalone computing device (e.g., device 100 of FIG. 1), the disclosed technologies may be implemented in a distributed computing environment. FIG. 3 is a block diagram of a distributed computing environment 300 in which the disclosed technologies may be implemented.

As shown, environment 300 comprises a history preserving data pipeline system 310 that implements one or more embodiments of the disclosed technologies, one or more data sources 320 (e.g., 320A, 320B, 302C . . . 320N) that provide data to the pipeline system 310, and one or more data sinks 330 (e.g., 330A, 330B, 330C . . . 330N) that consume data from the pipeline system 310.

In general, the data sources 320 provide data to the pipeline system 310 and the data sinks 330 consume data from the pipeline system 310. The pipeline system 310 stores data it obtains from the data sources 320 and data it provides to data sinks 330 in datasets, which are named collections of data. As described in greater detail elsewhere in this document, datasets are immutable and versioned to facilitate tracing of dataset data through the data pipeline 310 including historical (i.e., not current) versions of dataset data. In an embodiment, the current version of a dataset is the latest (most recent) version of the dataset.

The pipeline system 310 also manages aspects of building derived datasets, which are datasets that are generated by executing the current version of an associated derivation program.

In an embodiment, the current version of a derivation program is the latest (most recent) version of the derivation program. The derivation program may generate the data in a derived dataset it creates based on data in one or more other datasets. Alternatively, the derivation program may generate derived dataset set independent of any input datasets. For example, a derivation program may obtain data from one or more data sources 320 directly and use the obtained data to generate data of a derived dataset. It is also possible for a derivation program to generate derived dataset data in this way where the derivation program also accepts one or more other datasets as input used for generating the derived dataset.

In many cases, data provided by a data source 320 to the pipeline system 310 that is consumed by a data sink 330 from the pipeline system 310 is not consumed by the data sink 330 in the same data format as which it was provided. In other words, the data pipeline 310 may transform data provided by a data source 320 in one or more data transformation steps before it is provided to a data sink 330. More specifically, derivation programs may transform data in datasets when generating (building) derived datasets in one or more data transformation steps before the derived datasets are provided to data sinks 330.

A data transformation step generally involves converting data in a "source" data format to data in a "target" data format. Such a data transformation step may involve mapping data elements of the data in the source data format to data elements in the target data format. Such mapping can be one-to-one, one-to-many, many-to-one, or many-to-many. In an embodiment, a data transformation step on dataset data is carried out, at least in part, with a data analytics cluster computing instance such as, for example, APACHE SPARK instance, an APACHE HIVE instance, or the like. For example, a derivation program may contain one or more SPARK SQL, HIVEQL, or GROOVY commands which, when executed by the data pipeline system 310, carry out one or more data transformation steps on dataset data.

3.1 Data Sources

A data source 320 (e.g., 320B) is any source of data provided to the data pipeline system 310 for storing in one or more datasets. A dataset may be defined as a named collection of data. From the perspective of a data source 320 (e.g., 320C), data provided by the data source to the pipeline system 310 can be structured, semi-structured, or unstructured data.

Structured data includes, but is not limited to, data that conforms to a well-known data model. Examples of structured data include, but are not limited to, data stored in a relational database and spreadsheet data.

Semi-structured data includes, but is not limited to, data that may not necessarily conform to a well-defined data model but nonetheless includes self-describing structure. Such self-describing structure may be in the form of tags, markup elements, or other syntactic elements that separate semantic elements from each other within the data and enforce hierarchical relationships between semantic elements. Non-limiting examples of semi-structured data include, but are not limited to, eXtensible Markup Language (XML) data and JavaScript Object Notation (JSON) data.

Unstructured data includes, but is not limited to, data that does not conform to a data model and does not contain self-describing structure. Examples of unstructured data include, but are not limited to, HyperText Markup Language (HTML) data (e.g., web pages) and other text data.

A data source 320 (e.g., 320A) typically comprises one or more non-volatile data storage devices (e.g., one or more hard disks, solid state drives, or the like) on which the provided data is physically stored. Typically, the data is physically stored in one or more data containers such as, for example, in one or more file system files or in one or more other suitable data containers (e.g., a disk block). The one or more data storage devices (and hence the data source) may be embodied in a single computing device or distributed across multiple computing devices.

A data source 320 (e.g., 320A) typically also comprises a data access mechanism that a data requesting mechanism can use to obtain data from the data source. Typically, the data access mechanism of a data source comprises one or more executing software programs (e.g., application program 202A) for reading data from one or more data containers of one or more data storage devices of the data source in response to a request for the data from a data requesting mechanism and for providing the requested data to the data requesting mechanism in response to the request.

Typically, the data requesting mechanism also comprises one or more executing software programs (e.g., application program 202B). The data requesting mechanism may be a component of or a component separate from a data source 320 from which it requests data. Non-limiting examples of a data access mechanism include a database management system server, a network file server, a web server, or other server. Examples of a data requesting mechanism include, but are not limited to, a client application or other application for requesting data from a server.

The request for data from a data requesting mechanism to the data access mechanism of a data source 320 (e.g., 320N) may be made according to a well-known inter-process communication protocol such as, for example, a well-known networking protocol such as, for example, the HyperText Transfer Protocol (HTTP), the Structured Query Language (SQL) or other database query language networking protocol, a Remote Procedure Call (RPC) protocol (e.g., the Simple Object Access Protocol (SOAP)), a Network File System (NFS) protocol, and so forth. The network request may also be cryptographically secured according to a cryptographic protocol (e.g., Transport Layer Security/Secure Sockets Layer (TLS/SSL)).

In some instances, a data requesting mechanism may not use an inter-process communication mechanism such as a networking protocol to request data from a data access mechanism of a data source 320 (e.g., 320B). For example, if the data source 320 (e.g., 320B) is one or more file system files, then a data requesting mechanism may use an operating system application programming interface (API) to read data from the file(s). In this example, the operating system is considered to be the data access mechanism.

The distributed computing environment 300 may have tens, hundreds, or even thousands or more data sources 320. Each of the data sources 320 may provide different data, possibly even in different data formats. As just one simple example, one data source 320 (e.g., 320A) may be a relational database server that provides rows of data, another data source 320 (e.g., 320B) may be a log file that stores log entries as lines of character data, and another data source 320 (e.g., 320C) may be a web service that provides data in one or more Simple Object Access Protocol (SOAP) messages. Overall, the data pipeline system 310 may be provided with heterogeneous data from multiple heterogeneous data sources 320.

A data requesting mechanism that provides data obtained from a data source 320 (e.g., 320B) to the history preserving data pipeline system 310 is referred to herein as a "data provider". The environment 300 may comprise multiple data providers. For example, there could be a separate data provider for each data source 320 that is to provide data to the data pipeline system 310. As described in greater detail elsewhere in this document, a data provider can use a transaction service 318 to provide data to the data pipeline system 310.

3.2 Data Sinks

A data sink 330 (e.g., 330B) is any consumer of dataset data from the data pipeline system 310. For the perspective of a data sink 330 (e.g., 330C), the consumed data can be structured, semi-structured, or unstructured data.

A data sink 330 (e.g., 330A) typically comprises a data analysis mechanism for processing data obtained from the data pipeline system 310 in some particular way. Typically, the data analysis mechanism comprises one or more executing software programs (e.g., application program 202A) for analyzing, organizing, or otherwise processing data and presenting the results of data processing to a user. Examples of a data analysis mechanism include, but are not limited to, a graphical analysis software application or other software application for generating graphical charts, reports, or other graphical analysis of data in a graphical user interface. Another example of a data analysis mechanism is a text-based search engine that parses and indexes text data to provide a full-text searching service to users of the search engine.

The distributed computing environment 300 may have tens, hundreds, or even thousands or more data sinks 330. Each of the data sinks 330 may consume different data, possibly even in different data formats. Further, a data sink 330 (e.g., 330B) may consume data provided by one or more data sources 320. In other words, a data sink 330 may consume data obtained by the data pipeline system 310 from one data source 320 (e.g., 320A) or more than one data source 320 (e.g., 320A and 320B). Accordingly, a function of the data pipeline system 310 may be to combine data from multiple data sources 320 into a format that is consumable by a data sink 330. This is just one example of a possible function performed by the data pipeline system 310.

Overall, the environment 300 may comprise N data sources 320 and M data sinks 330 where N is equal to or different from M. Further, data the pipeline system 310 obtains from a data source 320 (e.g., 320B) may be provided by the pipeline system 310 to one or more data sinks 330 (e.g., one or more of 330A, 330B, 330C . . . 330N). Similarly, the pipeline system 310 may combine data obtained from multiple data sources 320 (e.g., 320A and 320B) and provide the combined data to one or more data sinks 330 (e.g., one or more of 330A, 330B, 330C . . . 330N). As data moves through the pipeline system 310 from the data sources 320 to the data sinks 330, a number of data transformation steps may be performed on the data to prepare the data obtained from the data sources 320 for consumption by the data sinks 330.

Environment 300 may include one or more data consuming mechanisms ("data consumers") for consuming (obtaining) dataset data from the data pipeline system 310 and providing the obtained data to one or more data sinks 330. Typically, a data consumer comprises one or more executing software programs (e.g., application program 202C). The data consumer may be a component of or a component separate from a data sink 330 to which it provides data. A data consumer may provide data obtained from the data pipeline system 310 in any manner that is suitable to a data sink 330 to which it is providing the data. For example, the data consumer may store the obtained data in a database or in a file system file or send the obtained data to a data sink 330 over a network (e.g., in one or more Internet Protocol (IP) packets). As described in greater detail elsewhere in this document, a data consumer can use the transaction service 318 of the history preserving data pipeline system 310 to consume (obtained) dataset data from the pipeline system 310.

3.3 History Preserving Data Pipeline System

A history preserving data pipeline system 310 comprises a storage plane 312 and a logic plane 316.

The storage plane 312 may be implemented with one or more non-volatile data storage devices, which may be distributed across one or more computing devices (e.g., device 100) on one or more data networks. The storage plane 312 comprises data lake 313, build database 314, and transaction database 315.

The data lake 313 is where datasets are stored. In an exemplary embodiment, the data lake 313 comprises a distributed file system implemented with commodity computing devices. For example, the data lake 313 may comprise the APACHE HADOOP DISTRIBUTED FILE SYSTEM (HDFS) or other distributed file system built on commodity computing hardware. The data lake 313 may also comprise archive storage for storing older dataset versions and/or to serve as a backup for a primary storage system of the data lake 313 (e.g., a distributed file system). In one exemplary embodiment, the AMAZON GLACIER archive storage service is used for archiving older versions of datasets.

The build database 314 and the transaction database 315 store metadata supporting functionality provided by the logic plane 316 of the history preserving data pipeline system 310 including metadata for supporting immutable and versioned datasets and for determining dataset build dependencies. The metadata stored and maintained in the build database 314 and the transaction database 315 by the logic plane 316 is described in greater detail elsewhere in this document with respect to FIG. 4.

The build database 314 and the transaction database 315 may be implemented with one or more conventional database systems that store data in one or more tables. The build database 314 and the transaction database 315 may be managed by the same database system or different database systems. At a minimum, the implementing database system should support atomic row updates. However, support for multi-row transactions is not required. In an exemplary embodiment, the APACHE HBASE database system is used to implement the build database 314 and the transaction database 315. In another exemplary embodiment, the APACHE CASSANDRA database system is used to implement the build database 314 and the transaction database 315. Another possible database system that may be used to implement the build database 314 and the transaction database 315 is the POSTGRES (also known as POSTGRESQL) open source database system.

Logic plane 316 may be implemented as one or more software programs (e.g., one or more application programs 202) that are configured to execute on one or more computing devices (e.g., device 100). Logic plane 316 comprises to two services: a build service 317 and a transaction service 318.

The transaction service 318 provides support for atomically creating, and updating immutable and versioned datasets in the context of transactions. Data providers may use the transaction service 318 to create and update datasets in the data lake 313 with data obtained from data sources 320 in the context of transactions. Data consumers may use the transaction service 318 to read data from datasets in the data lake 313 in the context of transactions that is then provided to the data sinks 330. In some embodiments, the transaction service 318 ensures that the data that can be read from a dataset is only data that has already been committed to the dataset by a previously successful transaction.

The build service 317 leverages the transaction service 318 to provide immutable and versioned derived datasets. A derived dataset may be defined as a dataset that is generated (built) by applying a derivation program (or one or more sets of computer-executable instructions) to one or more other datasets. Thus, it can be said that a derived dataset has a dependency on at least one other "base" dataset. A base dataset may accordingly be defined as a dataset on which at least one derived dataset has a dependency.

According to some embodiments, a derivation program may be defined as a set of instructions associated with a derived dataset and which, when executed, uses the transaction service 318 to read data from the base dataset(s) in the context of a transaction, transforms and/or validates the data in some way, and uses the transaction service 318 to write the transformed and/or validated data to the derived dataset in the context of a transaction. Each transaction that modifies a dataset is assigned a transaction identifier by the transaction service 318 that is unique to at least that dataset. The transaction service 318 records the transaction identifier in the transaction database 315. By doing so, each transaction that modifies a dataset is separately identifiable by its assigned transaction identifier. In addition, the transaction service 318 orders transactions on a dataset by the time that they are committed with corresponding transaction commit identifiers.

In order to increase automation of the pipeline, the build service 317 may maintain build dependency data that represents one or more directed acyclic graphs of dataset build dependencies. From the build dependency data, the build service 317 can determine for a given derived dataset the order in which to build other derived datasets before the given derived dataset can be built. As result, it is no longer necessary for a human engineer to determine the order in which datasets need to be built.

When a new version of a derived dataset is built, the build service 317 may create a build catalog entry (e.g., a row or record) in the build database 314. The build catalog entry identifies the version(s) of the base dataset(s) from which the new version of the derived dataset was built. By doing so, it can be determined for any given version of a derived dataset, including historical versions, the version(s) of the base dataset(s) from which the version of the derived dataset was built. Further, because datasets, including derived datasets, are immutable, data of a historical version of a derived dataset can be traced to the data from which it was derived, even if that data is also historical.

The build service 317 may also version derivation programs for tracing and tracking purposes. In this case, the build catalog entry may also contain the version of the derivation program that was executed by the build service 317 to build the new version of the derived dataset.

The functionality of the build service 317 and the transaction service 318 are described in greater detail elsewhere in this document.

The build service 317 and the transaction service 318 may each provide an interface by which users and/or other software programs can invoke the services thereof by issuing one or more commands thereto and/or requests thereof.

For example, the interface may be a graphical user interface, a command line interface, a networking interface, or an application programming interface (API).

4.0 History Preserving Data Pipeline System Operation

Figure 4:
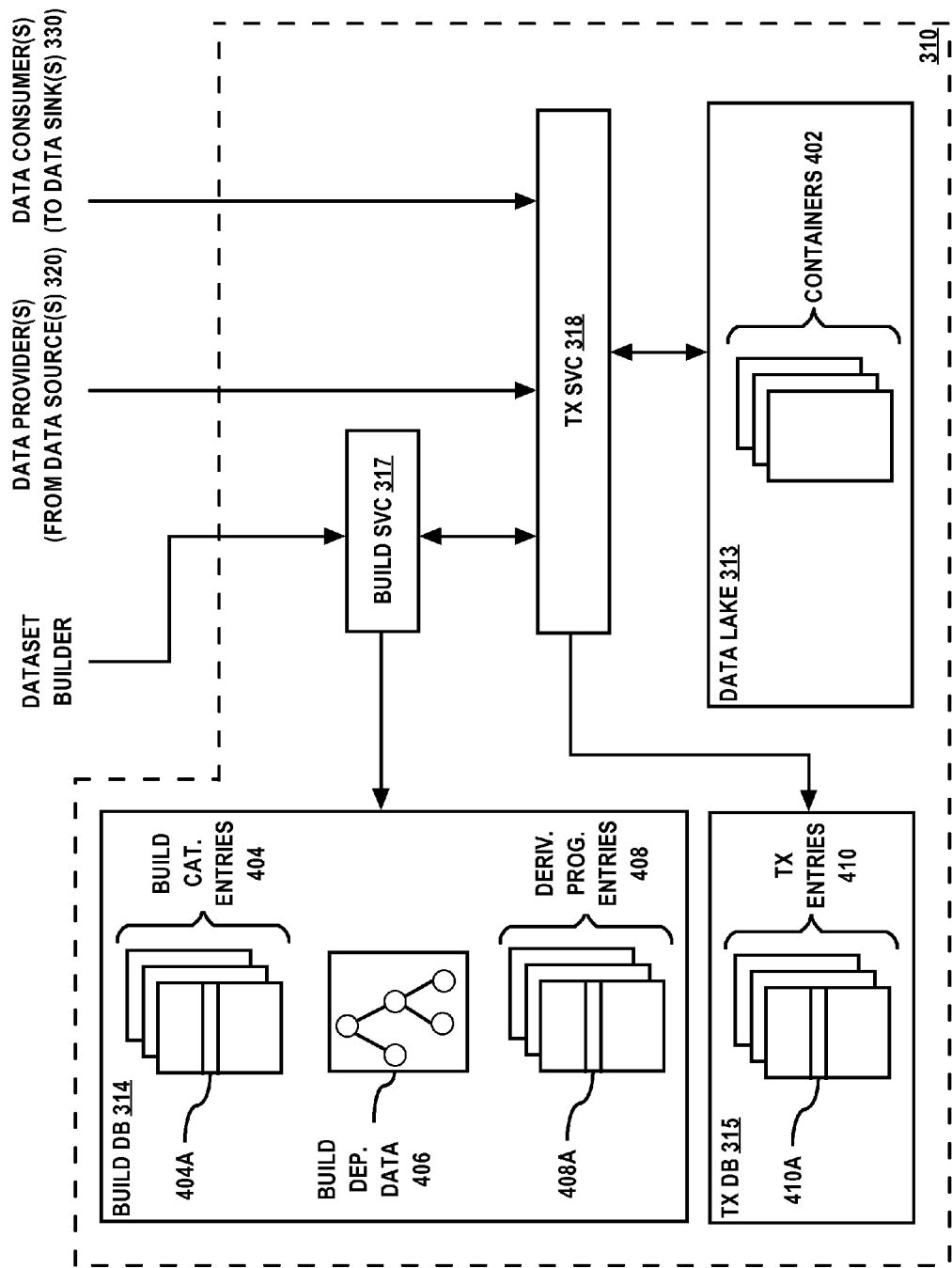
FIG. 4 is a block diagram of a history preserving data pipeline system that implements the disclosed technologies, according to an embodiment of the present invention.

FIG. 4 is a block diagram illustrating the history preserving data pipeline system 310 in greater detail. As shown, there are at least three computer "users" of the system 310: a dataset builder, one or more data providers, and one or more data consumers.

4.1 Dataset Builder

The dataset builder periodically invokes the build service 317 to build derived datasets. For example, the dataset builder may send a network request to or otherwise invoke the build service 317 to build one or more specifically identified datasets or to build all datasets.

In an embodiment, the dataset builder issues a "build all" command to the build service 317 on a periodic basis (e.g., once a day). The build service 317 interprets the build all command as a command to build all known derived datasets that are "out-of-date". Known datasets are those specified in the build dependency data 406. Generally, a derived dataset is out-of-date if no version of the derived dataset exists in the data lake 313 or the current version of the derived dataset in the data lake 313 is out-of-date.

The build dependency data 406 represents one or more directed acyclic graphs (also referred to herein as a "build dependency graph"). There may be multiple such graphs if, for example, none of the datasets represented by a graph has a build dependency on a dataset represented by another graph. Each graph comprises nodes and one or more directed edges connecting the nodes. A leaf node of a graph corresponds to a dataset that does not have any build dependencies on another dataset. A non-leaf node of a graph corresponds to a dataset that has a build dependency on at least one other dataset. A root node of a graph is a non-leaf node but where there are no build dependencies on the dataset represented by the root node. A graph may have only one root node or may have multiple root nodes. A directed edge connecting two nodes in a graph represents a build dependency between two datasets. A graph may be represented in a computer memory as an N-ary tree data structure or other suitable data structure.

Figure 8:
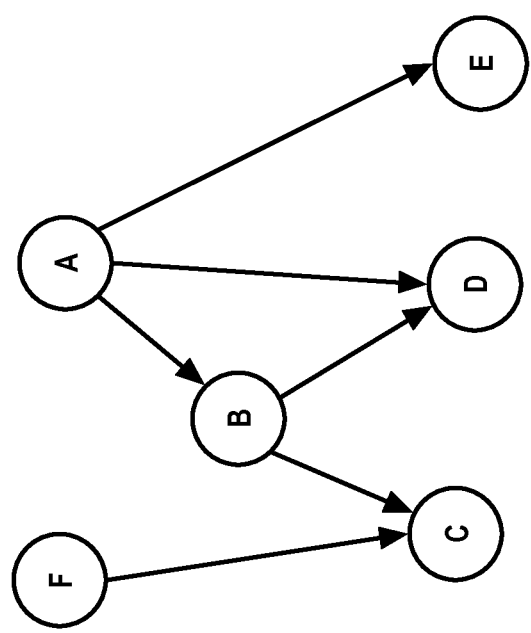
FIG. 8 illustrates a simple example of a build dependency graph, according to an embodiment of the present invention.

To illustrate a build dependency graph by a simple example, consider graph 800 of FIG. 8. Each circle of graph 800 represents a node of the build dependency graph and each arrow connecting two circles of graph 800 represents a directed edge of the build dependency graph. The letter in each circle of graph 800 represents the name of the dataset represented by the corresponding node. As shown, datasets F and A are represented by root nodes of the build dependency graph, datasets C, D, and E are represented by leaf nodes of the build dependency graph, and dataset B is represented by a non-leaf node of the build dependency graph. Also shown, dataset F has a build dependency on dataset C, dataset B has build dependencies on datasets C and D, and dataset A has build dependencies on datasets B, C, D, and E. Dataset A's build dependency on dataset C is transitive by way of dataset B. Datasets F and B may be considered the "parent" datasets of dataset C (and dataset C the "child" of datasets F and B), datasets B and A the parent datasets of dataset D (and dataset D the child of datasets B and A), and dataset A the parent dataset of datasets B, D, and E (and datasets B, D, and E the children of dataset A). However, dataset A is not considered a parent of dataset C and dataset C is not considered a child of dataset A.

Referring once again to FIG. 4, the dataset builder may be implemented as one or more computer programs or computer controls scripts (i.e., one or more sets of computer-executable instructions). The dataset builder may execute as part of the build service 317 and/or the transaction service 318 (i.e., in the same process space). Alternatively, the dataset builder may execute as a separate process from the process(es) of the build service 317 and the transaction service 318.

In an embodiment, the dataset builder implements a message queue between the transaction service 318 and the build service 317. When a new version of a dataset in the data lake 313 is created or updated in the context of a committed transaction, the transaction service 318 adds a message to the tail of the message queue specifying the name of the created or updated dataset and a version identifier for the new version of the dataset. In an embodiment, the version identifier for the new version of the dataset is a transaction identifier (e.g. 704) of the transaction that successfully committed the new version of the dataset.

The build service 317 removes messages from the head of the message queue. For each such message removed from the message queue, the build service 317 determines from build dependency data 406 any datasets that directly depend on the dataset named in the message. The datasets that directly depend on the named dataset can be identified in the build dependency data 406 from any parent node(s) of the node corresponding to the named dataset in a build dependency graph, assuming each node in the build dependency graph is associated in the build dependency data 406 with the name or identifier of the dataset the node represents.

In some embodiments, the build service 317 then builds new version(s) of the dataset(s) that directly depend on the named dataset with the aid of the transaction service 318. Assuming the new version(s) of the dataset(s) are successfully committed to the data lake 313, this causes the transaction service 318 to add message(s) to the message queue for the new version(s) of the derived dataset(s) that directly depend on the named dataset. The build service 317 continuously removes messages from the head of the message queue and builds new versions of datasets in this way until the message queue becomes empty (e.g., after a dataset that has no dependencies on it is built).

In some embodiments, the build service 317 only builds a new version of a given dataset that depends on (i.e., is a parent of) a dataset named in a message obtained from the message queue if the current version of the given dataset is out-of-date with respect to the named dataset. As explained in greater detail elsewhere in this document, to determine whether the current version of a dataset is out-of-date with respect to a child dataset, the build service 317 consults build catalog entries 404 stored in the build database 314.

The build service 317 can receive a command from the dataset builder to build a specifically named derived dataset. Alternatively, the build service 317 can receive a command from the dataset builder to build all derived datasets. In the latter case, the build service 317 may treat the command to build all derived datasets as one or more commands to build each derived dataset corresponding to a root node in the build dependency data 406. In both cases, the build service 317 may rebuild a given derived dataset only if the dataset is out-of-date with respect to its build dependencies.

To determine whether a given derived data is out-of-date with respect to its build dependencies, the build service 317 traverses the build dependency graph starting at the node corresponding to the given derived dataset and visits at least every non-leaf node in the graph sub-tree that is rooted at the node corresponding to the given derived dataset. During the traversal, nodes are visited in post-order according to a depth-first traversal algorithm. For example, referring briefly to FIG. 8, if the given dataset is A, then a post-order depth-first recursive traversal of graph 800 would visit the node for dataset C and the node for dataset D before visiting the node for dataset B and would visit the node for dataset D and the node for dataset E before visiting the node for dataset A.

For each non-leaf node visited during the traversal, a determination is made whether the current version of the derived dataset corresponding to the visited non-leaf node is out-of-date with respect to any of its child datasets. As described in greater detail elsewhere in this document, to determine whether the current version of a dataset is out-of-date with respect to a child dataset, the build service 317 consults build catalog entries 404 stored in the build database 314. If the current version of the derived dataset is out-of-date with respect to any of its child datasets, then the build service 317 executes the current version of the derivation program for the derived dataset to generate a new version of the derived dataset. After executing the new version of the derived dataset has been generated, the build service 317 adds a new build catalog entry (e.g., 404A) to the build database 314 reflecting the new version of the derived dataset. In an embodiment, datasets are recursively rebuilt if dependencies of the dataset to be rebuilt are also out-of-date.

4.2 Build Catalog Entries

Figure 5:
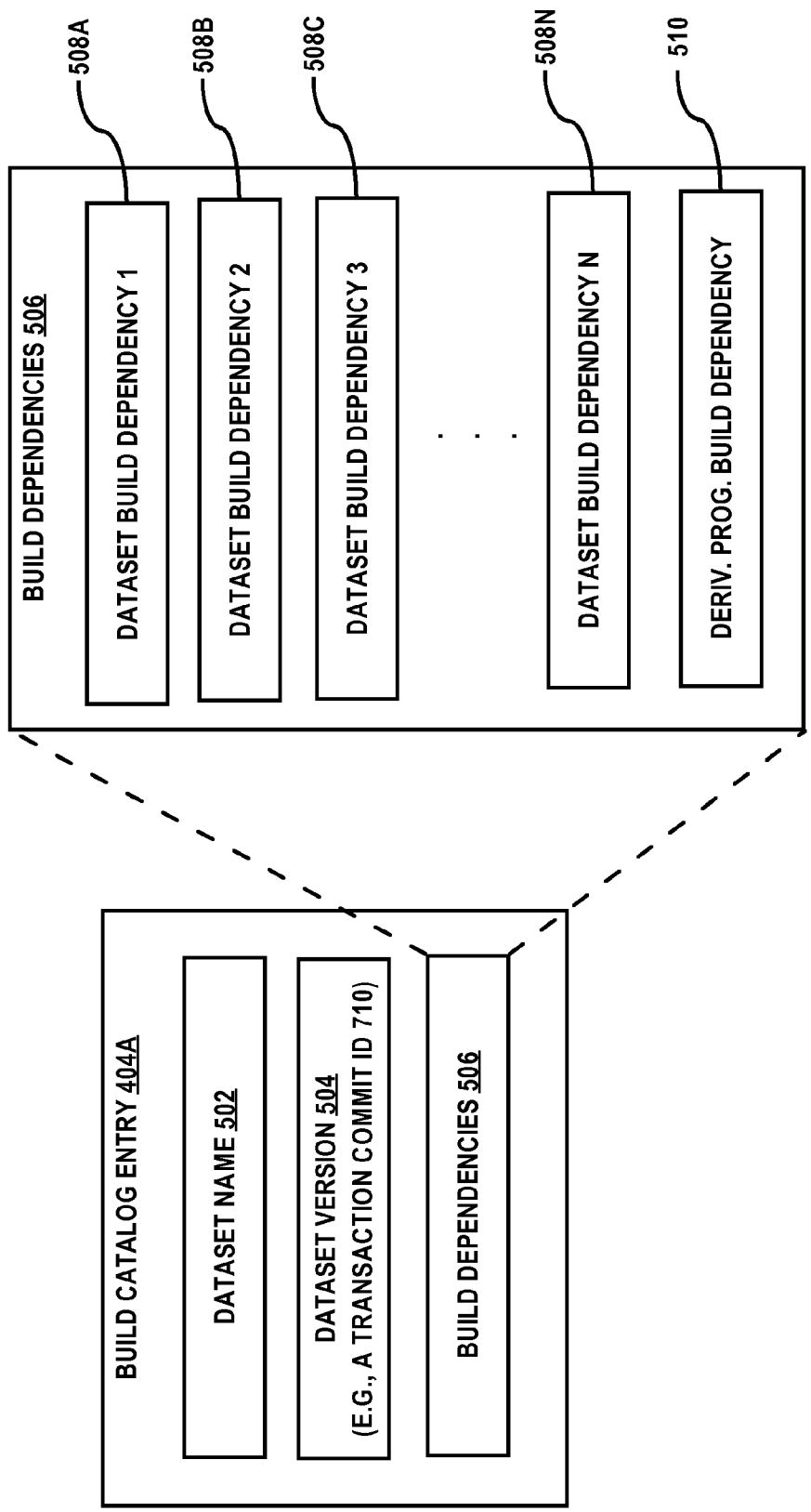
FIG. 5 is a block diagram of a build catalog entry, according to an embodiment of the present invention.

In an embodiment, as exemplified in FIG. 5, a build catalog entry (e.g., 404A) corresponding to a non-leaf node in the build dependency data 406 may comprise a dataset name 502, a dataset version 504, and build dependency information 506. Build service 317 adds a new build catalog entry (e.g., 404A) to build database 314 each time a new version of a derived dataset is built and committed to the data lake 313 in the context of a transaction facilitated by the transaction service 318. Thus, build database 314 may store a build catalog entry for each version of a derived dataset, including the current version of the derived dataset and any historical (prior) versions of the derived dataset.

The dataset name 502 is a unique identifier of a derived dataset. The dataset name 502 may be used to identify the derived dataset across all versions of the derived dataset. In other words, the dataset name 502 may be the same in all build catalog entries 404 for all versions of the derived dataset.

The dataset version 504 is a unique identifier of a version of the derived dataset. Typically, the dataset version 504 is an ordinal or other information that can be used to determine whether the version of the derived dataset represented by the dataset version 504 happened before or happened after other versions of the derived dataset represented by other build catalog entries 404 in the build database 314 with the same dataset name 502. In an embodiment, the dataset version 504 is an identifier (e.g., a transaction commit identifier) assigned by the transaction service 318 to a commit of a transaction that stored the version 504 of the derived dataset to the data lake 313.

The build dependencies 506 may comprises a list of one or more dataset build dependencies 508 and a derivation program build dependency 510. The list of dataset build dependencies 508 correspond to any child datasets input to the version of the derivation program used to build the version 504 of the derived dataset. If no such datasets were input, then the list of dataset build dependencies 508 may be an empty list.

In an embodiment, each dataset build dependency (e.g., 508A) specifies the name and the version of a dataset that the version 504 of the derived dataset was built (generated) from. For example, the name and the version of a dataset build dependency (e.g., 508B) may correspond to a dataset name 502 and a dataset version 504 of a build catalog entry (e.g., 404A) for a version of a dataset that the version 504 of the derived dataset was generated (built) from.

In an embodiment, the derivation program build dependency 510 specifies the name and the version of a derivation program that the build service 317 executed to generate (build) the version 504 of the derived dataset. For example, the name and the version of the derivation program dependency 510 may correspond to a derivation program entry (e.g., 408A) for the version of the derivation program that was executed by the build service 317 to generate (build) the version 504 of the derived dataset.

In an embodiment, the build service 317 identifies the current version of a derived dataset by querying build catalog entries 404 for the build catalog entry (e.g., 404A) comprising the latest (most recent) dataset version 504 and having a dataset name 502 matching a name for the derived dataset specified as a query parameter.

In an embodiment, the build service 317 determines whether the current version of a given dataset is out-of-date based on the build catalog entry (e.g., 404A) for the current version of the given dataset. The current version of the given dataset may be considered out-of-date for any one of a number of reasons including because: 1) there is a version of the derivation program that is newer than the version used to build the current version of the given dataset, 2) there is a version of a child dataset that is newer the version of the child dataset from which the current version of the given dataset was built, or 3) a dependency of the given dataset on another dataset was added or removed.

4.3 Derivation Program Entries

Figure 6:
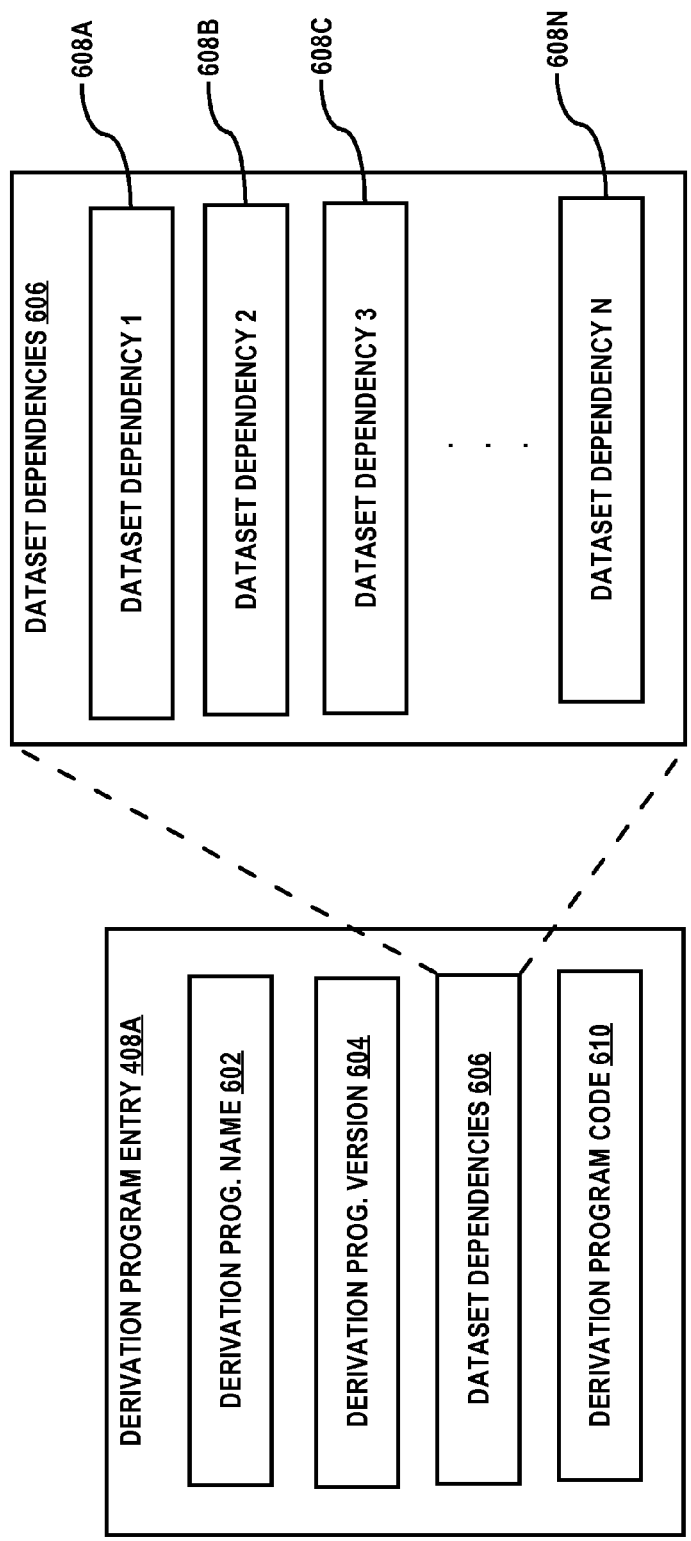
FIG. 6 is a block diagram of a derivation program entry, according to an embodiment of the present invention.

As shown in FIG. 6, a derivation program entry (e.g., 408A) in the build database 314 may comprise a derivation program name or other identifier 602, a derivation program version 604, a list 606 of dataset dependencies 608, and the executable code 610 of the version 604 of the derivation program itself.

The derivation program name 602 is a unique identifier of a derivation program. The derivation program name 602 may be used to identify the derivation program across all versions of the derivation program. In other words, the derivation program name 602 may be the same in all derivation program entries (e.g., 408A) for all versions of the derivation program.

The derivation program version 604 is a unique identifier of a version of the derivation program. Typically, the derivation program version 604 is an ordinal or other information that can be used to determine whether the version of the derivation program represented by the derivation program version 604 happened before or happened after other versions of the derivation program represented by other build catalog entries 408 in the build database 314 with the same derivation program name 602. For example, if there are three versions of a derivation program, then three derivation program entries 408 may be stored in build database 314 all with the same program name 602 and with different derivation program versions 604. For example, the derivation program version 604 in the three derivation program entries could be 1, 2, and 3, respectively.

The derivation program entry 408A may also comprises a list 606 of one or more dataset dependencies 608. The list 606 of dataset dependencies 608 correspond to any datasets that the version 604 of the derivation program depends on.

If the version 604 of the derivation program does not depend on any other datasets, then the list 606 of dataset build dependencies 608 may be an empty list.

In an embodiment, each dataset dependency (e.g., 608A) specifies the name of a dataset that the version 604 of the derivation program depends on. For example, the name of a dataset dependency (e.g., 608B) may correspond to a dataset name 502 of one or more build catalog entries 404 in the build database 314.

The derivation program code 610 comprises the actual computer-executable instructions of the version 604 of the derivation program. Alternatively, the derivation program code 610 comprises a pointer or address to a storage location of the actual computer-executable instructions.

In an embodiment, a dataset in build dependency data 406 is associated with a derivation program the dataset depends on. Such association can be made in the data 406 between the name (e.g., 502) of the dataset and the name (e.g. 602) of the derivation program.

In an embodiment, when a new derivation program entry (e.g., 408A) is added to the build database 314 for a new version of the derivation program, the direct dependencies in the build dependency data 406 for any datasets that depend on the derivation program are updated based on the list 606 of dataset dependencies 608 in the new derivation program entry.

For example, consider the following sequence of events: 1) build dependency data 406 indicates that dataset A has direct dependencies on datasets B and C and on derivation program P, and 2) a new derivation program entry is added to the build database 314 for a new version of the derivation program P, the new derivation program entry has a list 606 of dataset dependencies 608 of indicating datasets B, C, and D. In response to the new derivation program entry for derivation program entry P being added to build database 314, the build dependency data 406 may be updated to indicate that dataset A now has direct dependencies on datasets B, C and D.

In an embodiment, the build service 317 identifies the current version of a derivation program by querying derivation program entries 408 for the derivation program entry (e.g., 404A) comprising the latest (most recent) dataset version 604 and having a dataset name 602 matching a name for the derivation program specified as a query parameter.

4.4 Transaction Service

As mentioned, data providers provide data to the data pipeline system 310 obtained from data sources 320 and data consumers obtain data from the data pipeline system 310 and provide it to data sinks 330. To do so, the data providers and the data consumers may invoke the services of the transaction service 318.

The transaction service 318 facilitates writing immutable and versioned datasets in the context of transactions. To do so, the transaction service 318 implements a transaction protocol that the data providers and data consumers can invoke to carry out a transaction on a dataset.

Figure 9:
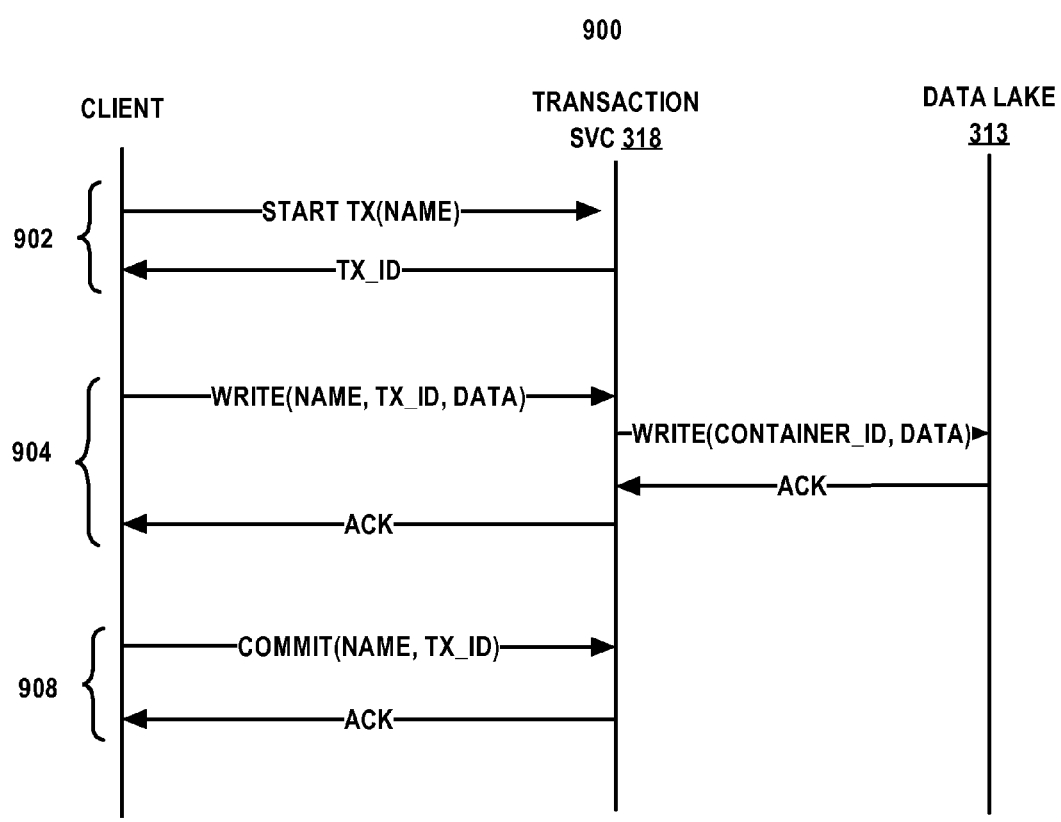
FIG. 9 is an interaction diagram of a transaction protocol facilitated by a transaction service, according to an embodiment the present invention.

As shown in FIG. 9, the transaction protocol for conducting write transaction 900 on a dataset comprises a start transaction command 902, one or more write dataset commands 904, and a commit command 908.

The transaction commands are issued by a client of the transaction service 318. The client may issue the commands to the transaction service 318 via an interface offered to the client by the transaction service 318. The interface may be, for example, an application programming interface accessible (invoke-able) over a network or from within a process.

In an embodiment, the client is one of the build service 317, a data provider, or a data consumer. At any given time, the transaction service 318 may be facilitating transactions on multiple datasets on behalf of multiple clients. For example, one client may write to a dataset in the context of a transaction while another client is reading from the dataset in the context of a transaction.

A transaction on a dataset is initiated by a client issuing a start transaction command 902 providing the name of the dataset. In response to receiving the start transaction command 902, the transaction service 318 assigns a transaction identifier to the transaction. The transaction identifier uniquely identifies the transaction at least for the dataset. After assigning a transaction identifier to the transaction on the dataset, the transaction identifier is returned to the client.

Once a transaction has been started, the client can perform a number of write operations on the dataset.

For a write command 904, the client provides the name of the dataset, the transaction identifier, and the data to write to the dataset. In response, the transaction service 318 writes the data to a container 402 in the data lake 313. The container 402 may be a file in a distributed file system, for example. To support immutable datasets, the transaction service 318 does not overwrite or otherwise delete or remove existing data from the dataset. In some embodiments, this is accomplished by storing differences between dataset data. For example, the data of a first version of a dataset may be stored in a first container 402 in the data lake 313 and the differences or deltas between the first version of the dataset and a second version of the dataset may be stored in a second container 402 in the data lake 313. This delta encoding approach can be more space-efficient in terms of space consumed in the data lake 313 when compared to an approach where all data of each version of a dataset is stored in a separate container 402. If the write to the data lake 313 is successful, the transaction service 318 returns an acknowledgement of the success to the client. Otherwise, the acknowledgement may indicate that the write failed in which case the client may abort the transaction.

Once the client has finished writing to the dataset, the client may commit any writes to the dataset by issuing a commit command 908 providing the dataset name and the transaction identifier. To commit the transaction, the transaction service assigns a commit identifier 710 to the transaction and 318 automatically updates a transaction entry (e.g., 410A) for the transaction in the transaction database 315. If the transaction is successfully committed, the transaction service returns an acknowledgement to the client indicating so. Otherwise, the acknowledgement indicates that the commit operation 908 was not successful.

While the transaction service 318 may be used to write data to a dataset in the context of a transaction, the transaction service 318 may also facilitate reading committed data from a dataset version. To do so, a client may issue a read command to the transaction service 318. In the read command, the client may specify the name and the version of the dataset version to read data from. In response to receiving the read command, the transaction service 318 may consult (read) the transaction entry in the transaction database 315 for the dataset name and version specified in the read command, if one exists. To identify this transaction entry, the transaction service 318 may query the transaction database 315 for a transaction entry having a dataset name (e.g., 702) equal to the dataset name specified in the read command and having a transaction commit identifier (e.g., 710) equal to the dataset version specified in the read command. The query may also exclude any transaction entries that do not have a value for the transaction committed flag (e.g., 708) that indicates that the corresponding transaction was successfully committed. Alternatively, the query may include only transaction entries that have a value for the transaction committed flag (e.g., 708) that indicate that the corresponding transaction was successfully committed.

If a transaction entry exists for a transaction that successfully committed the dataset name and version specified in the read command, then the transaction service 318 may provide data from the dataset version to the client or otherwise provide access to the client to data from the dataset version. If the transaction was not successfully committed, then the transaction service 318 may not provide data from the dataset version to the client. In this case, the transaction service 318 may also return an error or other indication that the dataset version was not successfully committed or that the read command failed.

In an embodiment, a read command from a client specifies a dataset name but does not specify any particular dataset version. The transaction service 318 may interpret this read command as a command to read data from the latest (more recent) successfully committed version of the dataset identified by the dataset name specified in the read command. The transaction service 318 can identify the latest version of the dataset by identifying the transaction entry in the transaction database 315 having a dataset name (e.g., 702) equal to the dataset name specified in the read command that has a value for the transaction committed flag (e.g., 708) that indicates the transaction represented by the transaction entry was successfully committed and that has the highest transaction commit identifier (e.g., 704) among all transactions successfully committed for the dataset.

4.5 Transaction Entries

Figure 7:
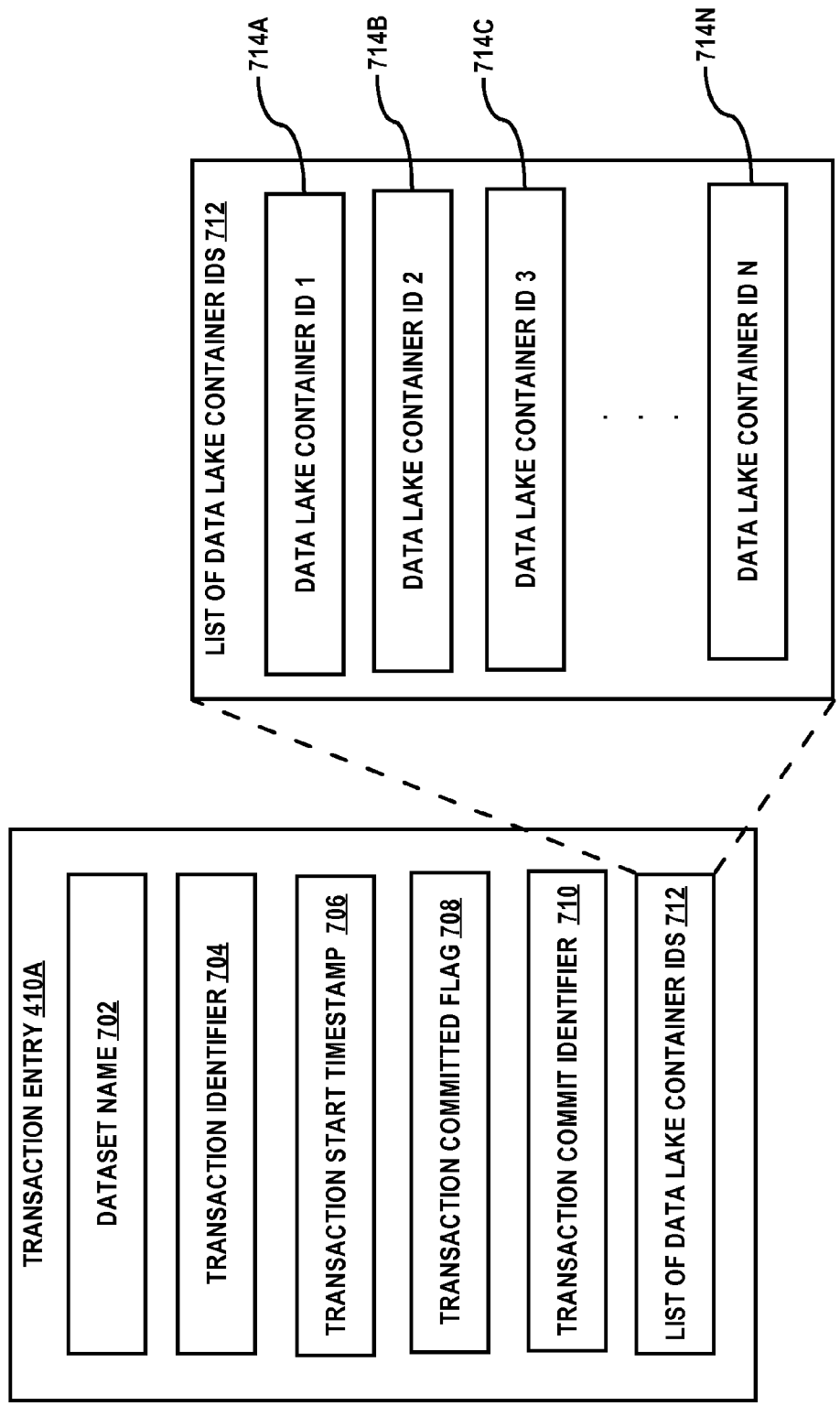
FIG. 7 is a block diagram of a transaction entry, according to an embodiment of the present invention.

In an embodiment, as shown in FIG. 7, a transaction entry (e.g., 410A) comprises a dataset name 702, a transaction identifier 704, a transaction start timestamp 706, a transaction committed flag 708, a transaction commit identifier 710, and a list 712 of data lake container identifiers 714. In other embodiments, a transaction entry comprises more or less information that is shown in FIG. 7. For example, a transaction entry may also have a transaction commit timestamp in addition to the transaction start timestamp 706.

A transaction entry (e.g., 410A) for a transaction on a dataset may be created at a first time and updated at a second time. The first time corresponds to when the transaction is started and the second time corresponds to when the transaction is committed. For example, a transaction entry (e.g., 410A) may be created in response to a start transaction command 902 and then subsequently updated in response to a commit transaction command 908.

When a transaction entry (e.g., 410A) is created in the transaction database 315 in response to a start transaction command 902, the dataset name 702, the transaction identifier 704 and the transaction start time stamp 706 may be populated in the entry. The transaction start time stamp 706 may be a system clock time corresponding to when the transaction was started. For example, the transaction service 318 may obtain a system clock time in response to receiving a start transaction command 902 to use to populate the transaction start time stamp 706 in the created entry. The transaction committed flag 708 may also be set when the entry is created to indicate that the transaction has not yet committed. To indicate this, the flag 708 can be a predefined value (e.g., N or 0) or left blank (NULL). The flag 708 may be checked to determine whether the transaction was committed. For example, if the flag 708 is present in an entry (e.g., 408A) for a transaction and has a certain predefined value (e.g., Y, TRUE, or 1) that indicates that the transaction was successfully committed, then the transaction is considered to have been successfully committed.

When a transaction entry (e.g., 408A) is updated in the transaction database 315 in response to a commit transaction command 908, the transaction committed flag 708, the transaction commit identifier 710, and the list 712 of data lake container identifiers 714 may be updated in the entry. The update to the entry to indicate that the transaction has been committed is preferably performed atomically to avoid putting the transaction database 315 in an incomplete or inconsistent state. For example, the transaction service 318 may attempt to update a transaction entry in the transaction database 315 with a put if absent operation.

As mentioned, the flag 708 may be updated to a predefined value that indicates that the transaction was committed.

The transaction commit identifier 710 provides a total ordering of all committed transactions on the dataset identified by the dataset name 702 of the entry. The transaction service 318 may assign a transaction commit identifier 710 to a transaction in response to a command (e.g., 908) to commit the transaction. For example, the transaction commit identifier 710 may be an integer or any other type of value (e.g. a timestamp) that can used for total ordering of transactions on a dataset.

The list 712 of data lake container identifiers 714 identify one or more data containers 402 in the data lake 313 in which any data written by the transaction is stored. The one or more data containers 402 may contain just the data written by the transaction, for example, in the form of differences or deltas to prior version(s) of the dataset. Alternatively, the one or more data containers 402 may contain all data of the version of the dataset resulting from the transaction.

5.0 Method for Preserving History of Derived Datasets

The following description presents method steps that may be implemented using computer-executable instructions, for directing operation of a device under processor control. The computer-executable instructions may be stored on a computer-readable storage medium, such, as CD, DVD, hard disk, flash memory, or the like. The computer-executable instructions may also be stored as a set of downloadable computer-executable instructions, for example, for downloading and installation from an Internet location (e.g., a Web server).

Turning now to FIG. 10, it illustrates an example process 1000 performed by history preserving data pipeline system 310 for preserving history of a derived dataset.

The example process 1000 illustrates immutable and versioned derived datasets. Because the derived datasets, like datasets generally, are immutable and versioned in the system 310, it is possible to trace dataset data to the data source data from which the dataset data was derived or obtained, even if the dataset data is no longer in the current version of the derived dataset and even if the data source data is no longer available from the data source The example process 1000 also illustrates how the history preserving data pipeline system 310 improves on existing data pipeline systems by providing the ability to trace dataset data to the data source data from which the dataset data was derived or obtained, even if the dataset data is no longer in the current version of the dataset and even if the data source data is no longer available from the data source.

The example process 1000 also illustrates how the system 310 provides the ability to trace dataset data to the data source data the dataset data is based on, but also, if the dataset is a derived dataset, to the version of the derivation program used to build the derived dataset, which can be useful for tracking down errors in dataset data caused by errors or "bugs" (i.e., programming errors) in the version of the derivation program that was executed to build the dataset.

The example process 1000 also illustrates how the system 310 alleviates human engineers from some manual tasks required by existing data pipeline systems related to maintaining and determining dataset build dependencies.

At step 1002, the data lake 313 stores a first version of a derived dataset in one or more containers 402. At the same time, a first transaction entry for a first transaction that committed the first version of the derived dataset to the data lake 313 is stored in the transaction database 315. The first transaction entry comprises the name 702 of the derived dataset, the identifier 704 of the first transaction, a timestamp 706 indicating when the first transaction was started, a flag 708 indicating that the first transaction was successfully committed, a transaction commit identifier 710 indicating when the first transaction was committed, and a list of 710 of one or more data lake container identifiers 712 identifying one or more containers 402 in the data lake 313 containing data of the first version of the derived dataset.

At step 1004, in response to the first version of the derived dataset being successfully committed to the data lake 313, the build service 317 stores a first build catalog entry in the build database 314. The first build catalog entry comprises the name 502 of the derived dataset, a version identifier 504 for the first version of the derived dataset which can be, for example, the transaction commit identifier 710 stored in the first transaction entry for the first version of the derived dataset, and build dependencies 506 reflecting any dataset dependencies 508 the first version of the derived dataset has on other datasets. For example, the first version of the derived dataset may depend on (i.e., may have been built based on) at least a first version of another dataset and this dependency may be reflected in the build dependencies 506 of the first build catalog entry. The build dependencies 506 of the first build catalog entry may also reflect, through the derivation program build dependency 510, a first version of a derivation program used to build the first version of the derived dataset.

At step 1006, the transaction service 318 updates the other dataset (i.e., a dataset the first version of the derived dataset depends on) to produce a second version of the other dataset resulting in the data lake 313 storing the second version of the other dataset.

At step 1008, the data lake 313 stores a second version of the derived dataset in one or more containers 402. At the same time, a second transaction entry for a second transaction that committed the second version of the derived dataset to the data lake 313 is stored in the transaction database 315. The second transaction entry comprises the name 702 of the derived dataset, the identifier 704 of the second transaction, a timestamp 706 indicating when the second transaction was started, a flag 708 indicating that the second transaction was successfully committed, a transaction commit identifier 710 indicating when the second transaction was committed, and a list of 712 of one or more data lake container identifiers 714 identifying one or more containers 402 in the data lake 313 containing data for the second version of the derived dataset.

At step 1010, in response to the second version of the derived dataset being successfully committed to the data lake 313, the build service 317 stores a second build catalog entry in the build database 314. The second build catalog entry comprises the name 502 of the derived dataset, a version identifier 504 for the second version of the derived dataset which can be, for example, the transaction commit identifier 710 stored in the second transaction entry for the second version of the derived dataset, and build dependencies 506 reflecting any dataset dependencies 508 the second version of the derived dataset has on other datasets. For example, the second version of the derived dataset may depend on (i.e., may have been built based on) at least the second version of the other dataset and this dependency may be reflected in the build dependencies 506 of the second build catalog entry. The build dependencies 506 of the second build catalog entry may also reflect, through the derivation program build dependency 510, the first version of the derivation program used to build the second version of the derived dataset.

6.0 Extensions and Alternatives

While the invention is described in some detail with specific reference to a single-preferred embodiment and certain alternatives, there is no intent to limit the invention to that particular embodiment or those specific alternatives. Therefore, those skilled in the art will appreciate that modifications may be made to the preferred embodiment without departing from the teachings of the present invention.

The invention claimed is:

1. A method comprising:
   at one or more computing devices comprising one or more processors and one or more storage media storing one or more computer programs executed by the one or more processors to perform the method, performing operations comprising:
   maintaining a build catalog comprising a plurality of build catalog entries;
   wherein each build catalog entry, of the plurality of build catalog entries, comprises:
   an identifier of a version of a derived dataset corresponding to the build catalog entry,
   one or more dataset build dependencies of the version of the derived dataset corresponding to the build catalog entry, each of the one or more dataset build dependencies comprising an identifier of a version of a child dataset from which the version of the derived dataset corresponding to the build catalog entry is derived, and
   a derivation program build dependency of the version of the derived dataset corresponding to the build catalog entry, the derivation program build dependency comprising an identifier of a version of a derivation program executed to generate the version of the derived dataset corresponding to the build catalog entry;
   creating a new version of a particular derived dataset in context of a successful transaction; and
   adding a new build catalog entry to the build catalog, the new build catalog entry comprising an identifier of the new version of the particular derived dataset, the identifier of the new version of the particular derived dataset being a transaction commit identifier assigned to the successful transaction.

2. The method of claim 1, wherein the operation of creating the new version of the particular derived dataset comprises an operation of executing a particular version of a particular derivation program; and wherein the new build catalog entry comprises an identifier of the particular version of the particular derivation program.

3. The method of claim 1, wherein a particular build catalog entry, of the plurality of build catalog entries, comprises a plurality of dataset build dependencies of the version of the derived dataset corresponding to the particular build catalog entry, each of the plurality of dataset build dependencies comprising an identifier of a version of a child dataset from which the version of the derived dataset corresponding to the particular build catalog entry is derived.

4. The method of claim 1, wherein the build catalog comprises a particular build catalog entry comprising an identifier of a version of a derived dataset corresponding to the build catalog entry but does not include any of a dataset build dependency or a derivation program build dependency.

5. One or more non-transitory storage media storing one or more computer programs, the one or more computer programs comprising instructions for performing operations comprising:
 maintaining a build catalog comprising a plurality of build catalog entries;
 wherein each build catalog entry, of the plurality of build catalog entries, comprises:
  an identifier of a version of a derived dataset corresponding to the build catalog entry,
  one or more dataset build dependencies of the version of the derived dataset corresponding to the build catalog entry, each of the one or more dataset build dependencies comprising an identifier of a version of a child dataset from which the version of the derived dataset corresponding to the build catalog entry is derived, and
  a derivation program build dependency of the version of the derived dataset corresponding to the build catalog entry, the derivation program build dependency comprising an identifier of a version of a derivation program executed to generate the version of the derived dataset corresponding to the build catalog entry;
 creating a new version of a particular derived dataset in context of a successful transaction; and
 adding a new build catalog entry to the build catalog, the new build catalog entry comprising an identifier of the new version of the particular derived dataset, the identifier of the new version of the particular derived dataset being a transaction commit identifier assigned to the successful transaction.

6. The one or more non-transitory storage media of claim 5, wherein the instructions for performing the operation of creating the new version of the particular derived dataset comprise instructions for performing an operation of executing a particular version of a particular derivation program; and wherein the new build catalog entry comprises an identifier of the particular version of the particular derivation program.

7. The one or more non-transitory storage media of claim 5, wherein a particular build catalog entry, of the plurality of build catalog entries, comprises a plurality of dataset build dependencies of the version of the derived dataset corresponding to the particular build catalog entry, each of the plurality of dataset build dependencies comprising an identifier of a version of a child dataset from which the version of the derived dataset corresponding to the particular build catalog entry is derived.

8. The one or more non-transitory storage media of claim 5, wherein the build catalog comprises a particular build catalog entry comprising an identifier of a version of a derived dataset corresponding to the build catalog entry but does not include any of a dataset build dependency or a derivation program build dependency.

9. A system comprising:
 one or more hardware processors;
 one or more computer programs; and
 one or more storage media storing the one or more computer programs for execution by the one or more hardware processors, the one or more computer programs comprising instructions for performing operations comprising:
  maintaining a build catalog comprising a plurality of build catalog entries;
  wherein each build catalog entry, of the plurality of build catalog entries, comprises:
   an identifier of a version of a derived dataset corresponding to the build catalog entry,
   one or more dataset build dependencies of the version of the derived dataset corresponding to the build catalog entry, each of the one or more dataset build dependencies comprising an identifier of a version of a child dataset from which the version of the derived dataset corresponding to the build catalog entry is derived, and
   a derivation program build dependency of the version of the derived dataset corresponding to the build catalog entry, the derivation program build dependency comprising an identifier of a version of a derivation program executed to generate the version of the derived dataset corresponding to the build catalog entry;
  creating a new version of a particular derived dataset in context of a successful transaction; and
  adding a new build catalog entry to the build catalog, the new build catalog entry comprising an identifier of the new version of the particular derived dataset, the identifier of the new version of the particular derived dataset being a transaction commit identifier assigned to the successful transaction.

10. The system of claim 9, wherein the instructions for performing the operation of creating the new version of the particular derived dataset comprise instructions for performing an operation of executing a particular version of a particular derivation program; and wherein the new build catalog entry comprises an identifier of the particular version of the particular derivation program.

11. The system of claim 9, wherein a particular build catalog entry, of the plurality of build catalog entries, comprises a plurality of dataset build dependencies of the version of the derived dataset corresponding to the particular build catalog entry, each of the plurality of dataset build dependencies comprising an identifier of a version of a child dataset from which the version of the derived dataset corresponding to the particular build catalog entry is derived.

12. The system of claim 9, wherein the build catalog comprises a particular build catalog entry comprising an identifier of a version of a derived dataset corresponding to the build catalog entry but does not include any of a dataset build dependency or a derivation program build dependency.

* * * * *